US012528300B2

(12) United States Patent
Murayama et al.

(10) Patent No.: US 12,528,300 B2
(45) Date of Patent: Jan. 20, 2026

(54) INK JET SYSTEM

(71) Applicant: SEIKO EPSON CORPORATION, Tokyo (JP)

(72) Inventors: Toshiro Murayama, Fujimi-Machi (JP); Tomonaga Hasegawa, Matsumoto (JP); Akira Miyagishi, Shiojiri (JP); Nobuaki Ito, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 18/507,168

(22) Filed: Nov. 13, 2023

(65) Prior Publication Data

US 2024/0157718 A1 May 16, 2024

(30) Foreign Application Priority Data

Nov. 15, 2022 (JP) ................................ 2022-182685

(51) Int. Cl.
*B41J 2/21* (2006.01)
*B41J 29/393* (2006.01)

(52) U.S. Cl.
CPC ........... *B41J 2/2132* (2013.01); *B41J 2/2103* (2013.01); *B41J 29/393* (2013.01); *B41J 2029/3937* (2013.01); *B41J 2203/01* (2020.08)

(58) Field of Classification Search
CPC ...... B41J 2/2132; B41J 2/2103; B41J 29/393; B41J 2029/3937; B41J 2203/01; H04N 1/603; H04N 1/6013; G06K 15/027
See application file for complete search history.

(56) References Cited

FOREIGN PATENT DOCUMENTS

JP 2021-084274 A 6/2021

*Primary Examiner* — Justin Seo
(74) *Attorney, Agent, or Firm* — WORKMAN NYDEGGER

(57) ABSTRACT

Provided is an ink jet system configured to communicate with a server, the ink jet system including: a first head unit that ejects a first type of ink onto a recording medium; a second head unit that ejects a second type of ink onto the recording medium; an acquisition section that acquires one or both of first information regarding the first head unit and the second head unit, and second information regarding the first type of ink and the second type of ink; a transmitter that transmits one or both of the first information and the second information to the server; and a receiver that receives, from the server, reference color information for forming a reference color on the recording medium, which is generated based on one or both of the first information and the second information.

12 Claims, 18 Drawing Sheets

FIG. 11

STT

| | SERIAL NUMBER OF HEAD UNIT HU-2 | hid-1 | | | hid-2 | | | | hid-m | | |
|---|---|---|---|---|---|---|---|---|---|---|---|
| SERIAL NUMBER OF HEAD UNIT HU-1 | MODEL NUMBER OF INK | kid-1 | … | kid-n | kid-1 | … | kid-n | … | kid-1 | … | kid-n |
| hid-1 | kid-1 | | | | – | … | … | … | – | … | … |
| | … | | | | … | … | … | … | … | … | … |
| | kid-n | | | | … | … | – | … | … | … | – |
| hid-2 | kid-1 | – | … | … | | | | … | – | … | … |
| | kid-2 | dCom-a, dCom-b | … | … | | | | … | … | … | … |
| | … | … | … | … | | | | … | … | … | … |
| | kid-n | … | … | – | | | | … | … | … | – |
| … | … | … | … | … | … | … | … | … | … | … | … |
| hid-m | kid-1 | – | … | … | – | … | … | … | | | |
| | … | … | … | … | … | … | … | … | | | |
| | kid-n | … | … | – | … | … | – | … | | | |

STI-1

FIG. 16

LT1

| R | G | B | C | M | Y |
|---|---|---|---|---|---|
| 0 | 0 | 0 | 255 | 255 | 255 |
| ... | ... | ... | ... | ... | ... |
| 0 | 0 | 128 | 128 | 128 | 0 |
| ... | ... | ... | ... | ... | ... |
| 255 | 255 | 255 | 0 | 0 | 0 |

LT2

| R | G | B | C | M | Y |
|---|---|---|---|---|---|
| 0 | 0 | 0 | 255 | 255 | 255 |
| ... | ... | ... | ... | ... | ... |
| 0 | 0 | 128 | 172 | 64 | 0 |
| ... | ... | ... | ... | ... | ... |
| 255 | 255 | 255 | 0 | 0 | 0 |

INK JET SYSTEM

The present application is based on, and claims priority from JP Application Serial Number 2022-182685, filed Nov. 15, 2022, the disclosure of which is hereby incorporated by reference herein in its entirety.

BACKGROUND

1. Technical Field

The present disclosure relates to an ink jet system.

2. Related Art

In the related art, there has been disclosed an ink jet printer having a head unit that ejects ink onto a recording medium. For example, JP-A-2021-84274 discloses an ink jet printer capable of ejecting a plurality of colors of ink.

However, in the above-described related art, when a reference color formed by combining different types of ink is formed on a recording medium from each of a plurality of head units, due to manufacturing errors of a plurality of head units and differences in the characteristics of a plurality of types of ink, a color that deviates greatly from a color desired by a user was formed on the recording medium in some cases. Therefore, in the above-described related art, there is a problem that a burden on the user is excessive when the color formed on the recording medium is adjusted to a color desired by the user.

SUMMARY

According to an aspect of the present disclosure, there is provided an ink jet system configured to communicate with a server, the ink jet system including: a first head unit that ejects a first type of ink onto a recording medium; a second head unit that ejects a second type of ink onto the recording medium; an acquisition section that acquires one or both of first information regarding the first head unit and the second head unit, and second information regarding the first type of ink and the second type of ink; a transmitter that transmits one or both of the first information and the second information to the server; and a receiver that receives, from the server, reference color information for forming a reference color on the recording medium, which is generated based on one or both of the first information and the second information.

BRIEF DESCRIPTION OF THE DRAWINGS

FIG. 11 is a diagram showing an example of contents of a reference color information management table.

FIG. 16 is a diagram showing an example of reference color information according to the second embodiment.

DESCRIPTION OF EMBODIMENTS

Embodiments for carrying out the present disclosure will be described below with reference to the drawings. Here, in each drawing, the dimensions and scales of each section are appropriately different from the actual ones. In addition, the embodiments described below are preferred specific examples of the present disclosure, and therefore, various technically preferable limitations are given, but the scope of the present disclosure is not limited to these forms unless there is a description to the effect that the present disclosure is particularly limited in the following description.

1. First Embodiment

Figure 1:
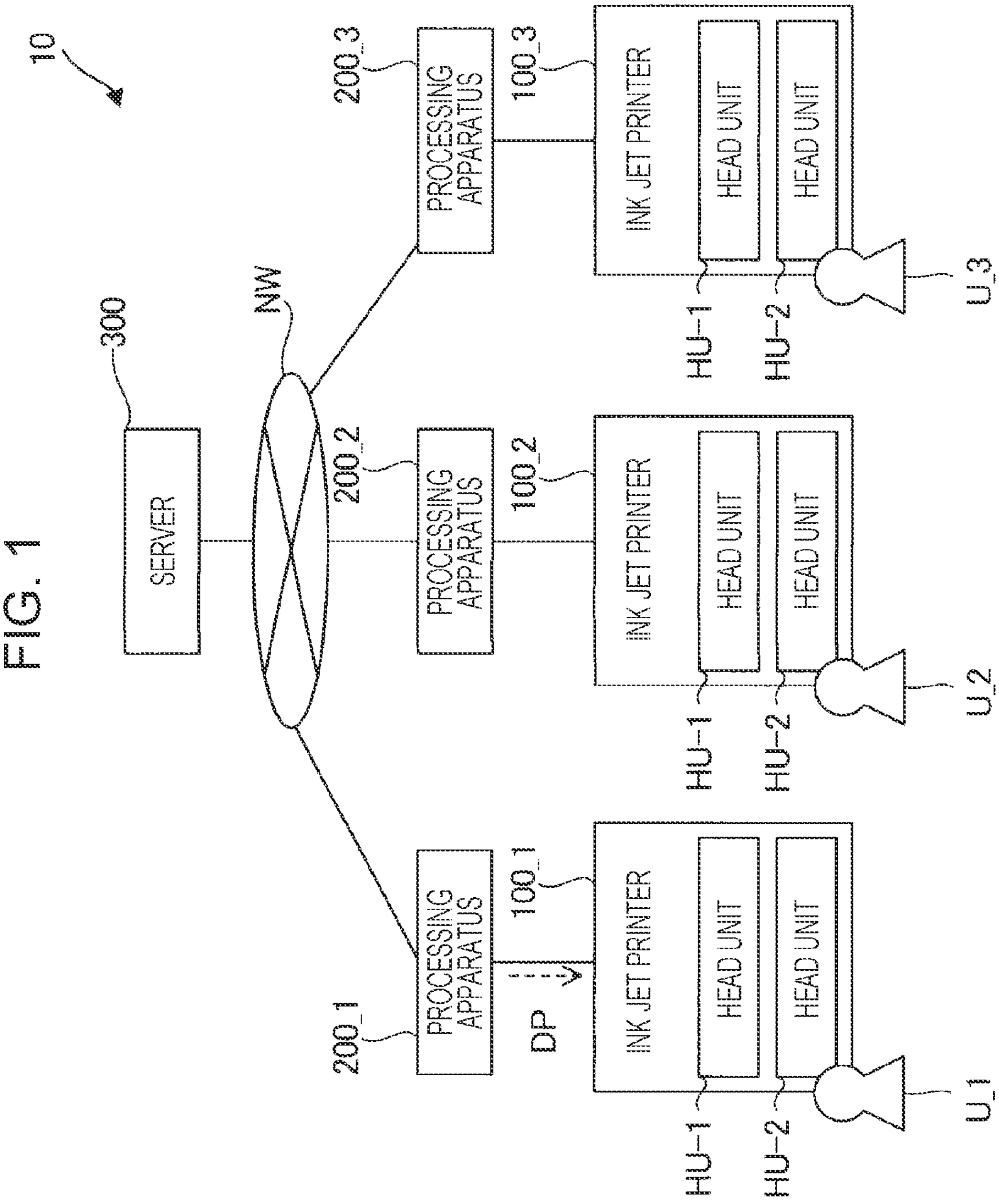
FIG. 1 is a schematic diagram showing a configuration example of an ink jet system according to a first embodiment.

FIG. 1 is a schematic diagram showing a configuration example of an ink jet system 10 according to a first embodiment. The ink jet system 10 is a system that forms an image by printing processing using an ink jet method. In the example shown in FIG. 1, the ink jet system 10 includes ink jet printers 100_1 to 1003, processing apparatuses 200_1 to 2003, and a server 300.

Here, the ink jet printers 100_1 to 100_3 are apparatuses provided by a manufacturer of the ink jet printers 100_1 to 100_3. In the following description, the ink jet printers 100_1 to 100_3 may be collectively referred to as the ink jet printer 100 without distinguishing between them. The ink jet printer 100 is a liquid ejecting apparatus that ejects ink, which is an example of a liquid. A manufacturer of the ink jet printer 100 is a company that manufactures the ink jet printer 100. The manufacturer of the ink jet printer 100 may be referred to as a "printer manufacturer". Each of the ink jet printers 100_1 to 100_3 may be provided by the same printer manufacturer or may be provided by different printer manufacturers. However, head units HU incorporated in the ink jet printers 100_1 to 100_3 are provided by a manufacturer of the head units HU. A manufacturer of the head units HU is a company that manufactures the head units HU. Hereinafter, the manufacturer of the head units HU may be referred to as a "head manufacturer". The printer manufacturer receives the provision of the head unit HU from the head manufacturer, and manufactures the ink jet printer 100 by incorporating the provided head unit HU into the ink jet printer 100.

FIG. 1 shows a user U_1 who uses the ink jet printer 1001, a user U_2 who uses the ink jet printer 100_2, and a user U_3 who uses the ink jet printer 1003. In the following description, the users U_1 to U_3 may be collectively referred to as the user U without distinguishing each of the users U_1 to U_3. For the user U, for example, when a worker belonging to a printer manufacturer uses the ink jet printer 100, this worker is the user U. Further, for example, when a third party who has received the provision of the ink jet printer 100 from the printer manufacturer uses the ink jet printer 100, this third party is the user U. In the following description, the third party who has received the provision of the ink jet printer 100 from the printer manufacturer may be referred to as an "end user". For each integer i from 1 to 3, a user U_i uses a processing apparatus 200_*i* in addition to an ink jet printer 100_*i*.

The ink jet printer 1001 is communicatively connected to the processing apparatus 200_1. The ink jet printer 100_2 is communicatively connected to the processing apparatus 200_2. The ink jet printer 100_3 is communicatively connected to the processing apparatus 200_3. In this way, the ink jet printers 1001 to 100_3 correspond to the processing apparatuses 200_1 to 2003, respectively, and are communicatively connected to the processing apparatuses 200_1 to 200_3. In the following description, the processing apparatuses 200_1 to 2003 may be collectively referred to as the processing apparatus 200 without distinguishing each of the processing apparatuses 200_1 to 200_3.

In the example shown in FIG. 1, the number of each of the ink jet printers 100 and the processing apparatuses 200 included in the ink jet system 10 is three, but the number is not limited thereto, and may be one, two, or four or more. That is, the number of pairs of the ink jet printer 100 and the processing apparatus 200 is not limited to three, and may be one, two, or four or more.

The ink jet printer 100 is a liquid ejecting apparatus that prints an image based on recording data DP from the processing apparatus 200 by an ink jet method. The recording data DP is image data in a format that can be processed by the ink jet printer 100.

The ink jet printer 100 includes a plurality of head units HU. Hereinafter, among the elements constituting the ink jet printer 100, the elements excluding the head unit HU may be referred to as a "printer main body". In the example shown in FIG. 1, for simplification of description, one ink jet printer 100 includes a head unit HU-1 and a head unit HU-2 as two head units HU, but the number of head units HU is not limited to two and may be three or more. The head unit HU-1 is an example of a "first head unit", and the head unit HU-2 is an example of a "second head unit".

The processing apparatus 200 is a desktop or laptop computer. The processing apparatus 200 executes image processing for generating the recording data DP and processing for controlling printing by the ink jet printer 100. In the image processing, the processing apparatus 200 generates recording data DP by, for example, executing various types of processing such as color conversion processing and RIP processing on the image data in a file format such as PostScript, PDF, and XPS. PDF is an abbreviation for Portable Document Format. XPS is an abbreviation for XML Paper Specification. RIP is an abbreviation for Raster image processor. The image data in the file format is, for example, data instructed by the user U to be the target of the printing processing. The color conversion processing is processing for converting an RGB value represented by image data in a file format into a CMYK value, a CMY value, or the like, which is an ink color used by the ink jet printer 100, with reference to a lookup table. In the following description, an example of conversion to a CMY value will be used for description. The lookup table defines the correspondence between RGB values and CMY values. The RIP processing is processing for generating recording data DP, which is data that can be printed by the ink jet printer 100, using information indicating a dither pattern and information indicating an error diffusion matrix.

The processing apparatus 200 is communicatively connected to the server 300 via a network NW such as a LAN, a WAN, and the Internet. LAN is an abbreviation for Local Area Network. WAN is an abbreviation for Wide Area Network.

The server 300 is a computer that functions as a cloud server. The server 300 is managed by, for example, a head manufacturer, a printer manufacturer, and a provider different from the end user. Hereinafter, the provider that manages the server 300 may be referred to as a "server provider". The head manufacturer uses a part of the server 300.

1-2. Configuration of Server 300

Figure 2:
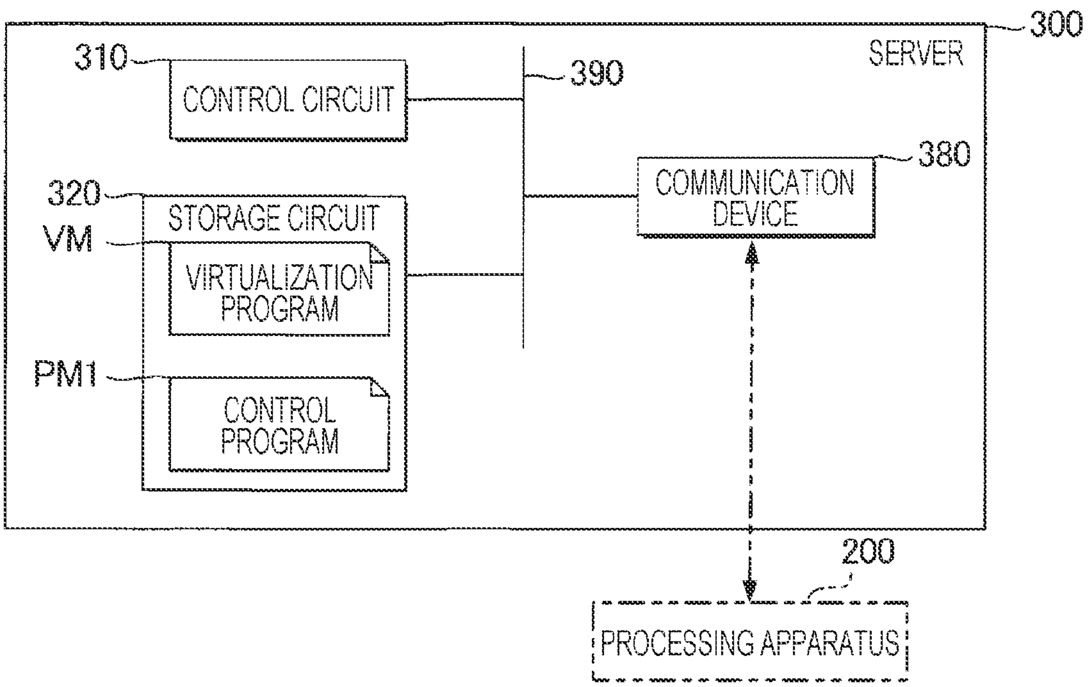
FIG. 2 is a diagram showing an example of a configuration of a server.

FIG. 2 is a diagram showing an example of a configuration of the server 300. The server 300 includes a control circuit 310, a storage circuit 320, and a communication device 380. The control circuit 310, the storage circuit 320, and the communication device 380 are coupled to one another via a bus 390 for communicating information.

The control circuit 310 includes, for example, a processor such as one or more CPUs. CPU is an abbreviation for Central Processing Unit. The control circuit 310 may include a programmable logic device such as an FPGA instead of or in addition to the CPU. FPGA is an abbreviation for Field Programmable Gate Array.

The storage circuit 320 is composed of a magnetic storage device, a flash ROM, or the like. The storage circuit 320 is a recording medium that can be read by the control circuit 310, and stores a plurality of programs including a virtualization program VM and a control program PM1 executed by the control circuit 310, various types of information used by the control circuit 310, and the like. The virtualization program VM divides resources such as the control circuit 310 and the storage circuit 320 of the server 300 into a plurality of resources, and operates each of the divided resources as a cloud server. The head manufacturer uses some cloud servers among a plurality of cloud server as a part of the server 300. The control program PM1 is developed by the head manufacturer. The storage circuit 320 includes, for example, one or both semiconductor memories of one or more volatile memories such as a RAM and one or more non-volatile memories such as a ROM, an EEPROM, or a PROM. RAM is an abbreviation for Random Access Memory. ROM is an abbreviation for Read Only Memory. EEPROM is an abbreviation for Electrically Erasable Programmable Read-Only Memory. PROM is an abbreviation for Programmable ROM.

However, the storage circuit 320 may not have the virtualization program VM, and the processing apparatus 200 may access the server 300 instead of the cloud server CS.

The communication device 380 is hardware having a communication circuit for communicating with the processing apparatus 200 via the network NW. The communication device 380 is also referred to as a network device, a network controller, a network card, or a communication module, for example.

1-3. Configuration of Processing Apparatus 200

Figure 3:
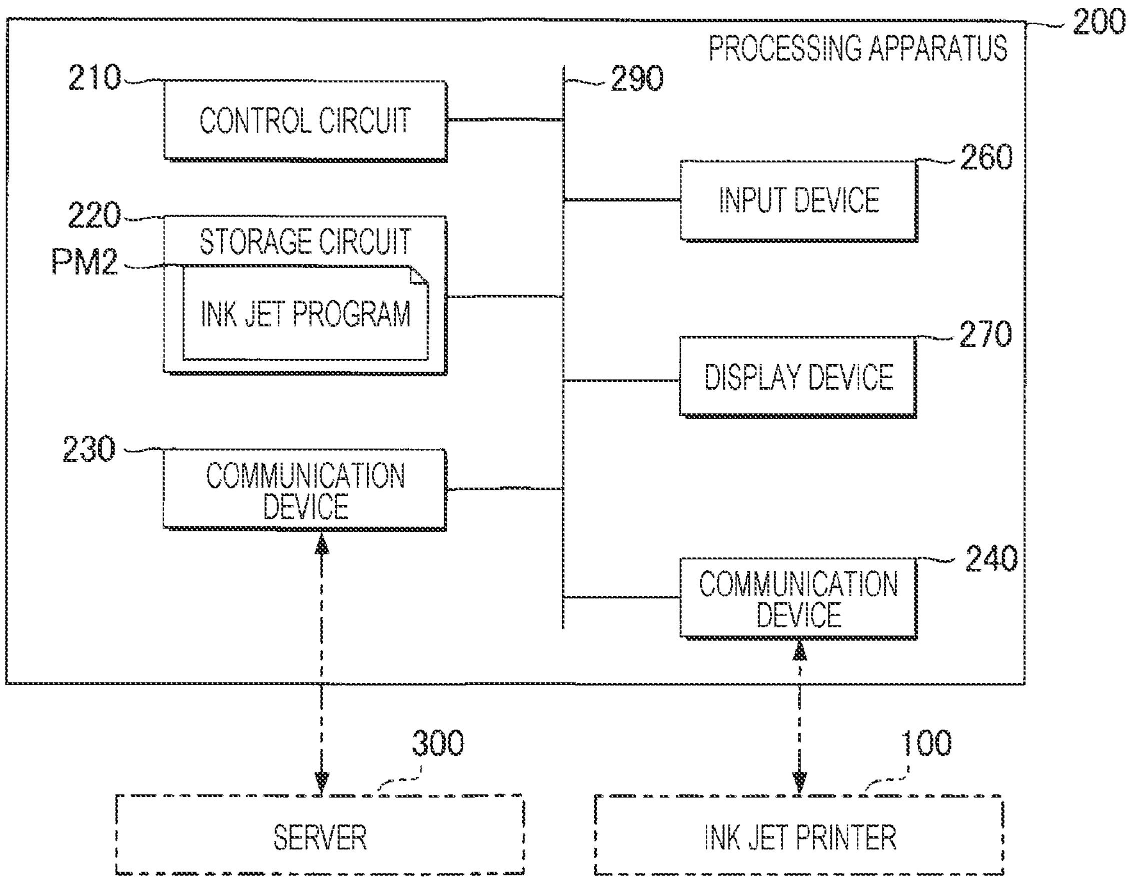
FIG. 3 is a diagram showing a configuration of a processing apparatus.

FIG. 3 is a diagram showing a configuration of the processing apparatus 200. The processing apparatus 200 includes a control circuit 210, a storage circuit 220, a communication device 230, a communication device 240, an input device 260, and a display device 270. The control circuit 210, the storage circuit 220, the communication device 230, the communication device 240, the input device 260, and the display device 270 are coupled to one another via a bus 290 for communicating information. The storage circuit 220 is an example of a "storage section".

The control circuit 210 includes, for example, a processor such as one or more CPUs. The control circuit 210 may include a programmable logic device such as an FPGA instead of or in addition to the CPU.

The storage circuit 220 is composed of a magnetic storage device, a flash ROM, or the like. The storage circuit 220 is a recording medium that can be read by the control circuit 210, and stores a plurality of programs including an ink jet program PM2 executed by the control circuit 210, various types of information used by the control circuit 210, and the like. The storage circuit 220 includes, for example, one or both semiconductor memories of one or more volatile memories such as a RAM and one or more non-volatile memories such as a ROM, an EEPROM, or a PROM. When the processing apparatus 200 is coupled to the ink jet printer 100, the ink jet program PM2 is downloaded from the server 300 and installed in the processing apparatus 200, for example.

The communication device 230 is hardware having a communication circuit for communicating with the processing apparatus 200 via the network NW. The communication device 230 is also referred to as a network device, a network controller, a network card, or a communication module, for example.

The communication device 240 is a circuit capable of communicating with the ink jet printer 100. For example, the communication device 240 is a network card such as USB or Bluetooth. USB is an abbreviation for Universal Serial Bus. USB and Bluetooth are registered trademarks.

The input device 260 is a device that outputs operation information according to the operation of the user U. The input device 260 is, for example, a mouse and a keyboard.

The display device 270 displays an image indicating some information to the user U. The display device 270 is an organic EL display, an LED display, and an LCD. EL is an abbreviation for Electro-Luminescence. LED is an abbreviation for Light Emitting Diode. LCD is an abbreviation for Liquid Crystal Display. Alternatively, a configuration in which the input device 260 and the display device 270 are integrated may be used. The configuration in which the input device 260 and the display device 270 are integrated is, for example, a touch panel.

1-4. Configuration of Ink Jet Printer 100

Figure 4:
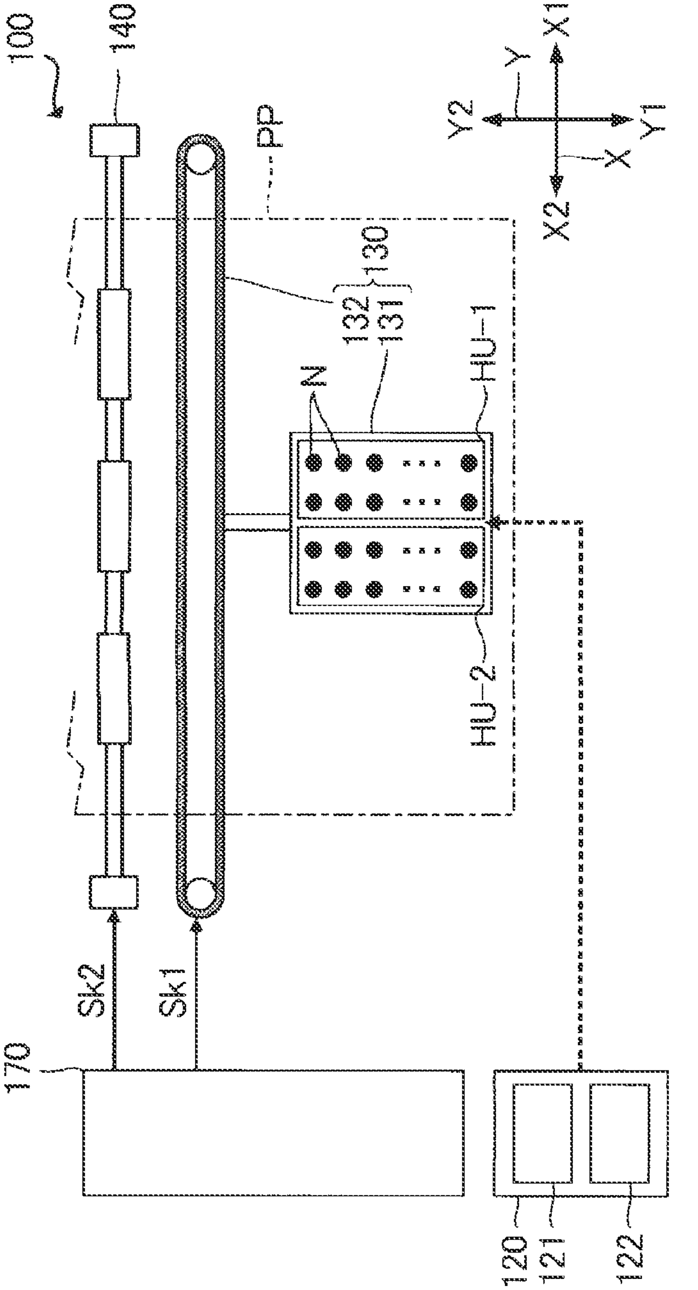
FIG. 4 is a schematic diagram illustrating an example of a configuration of an ink jet printer.
Figure 5:
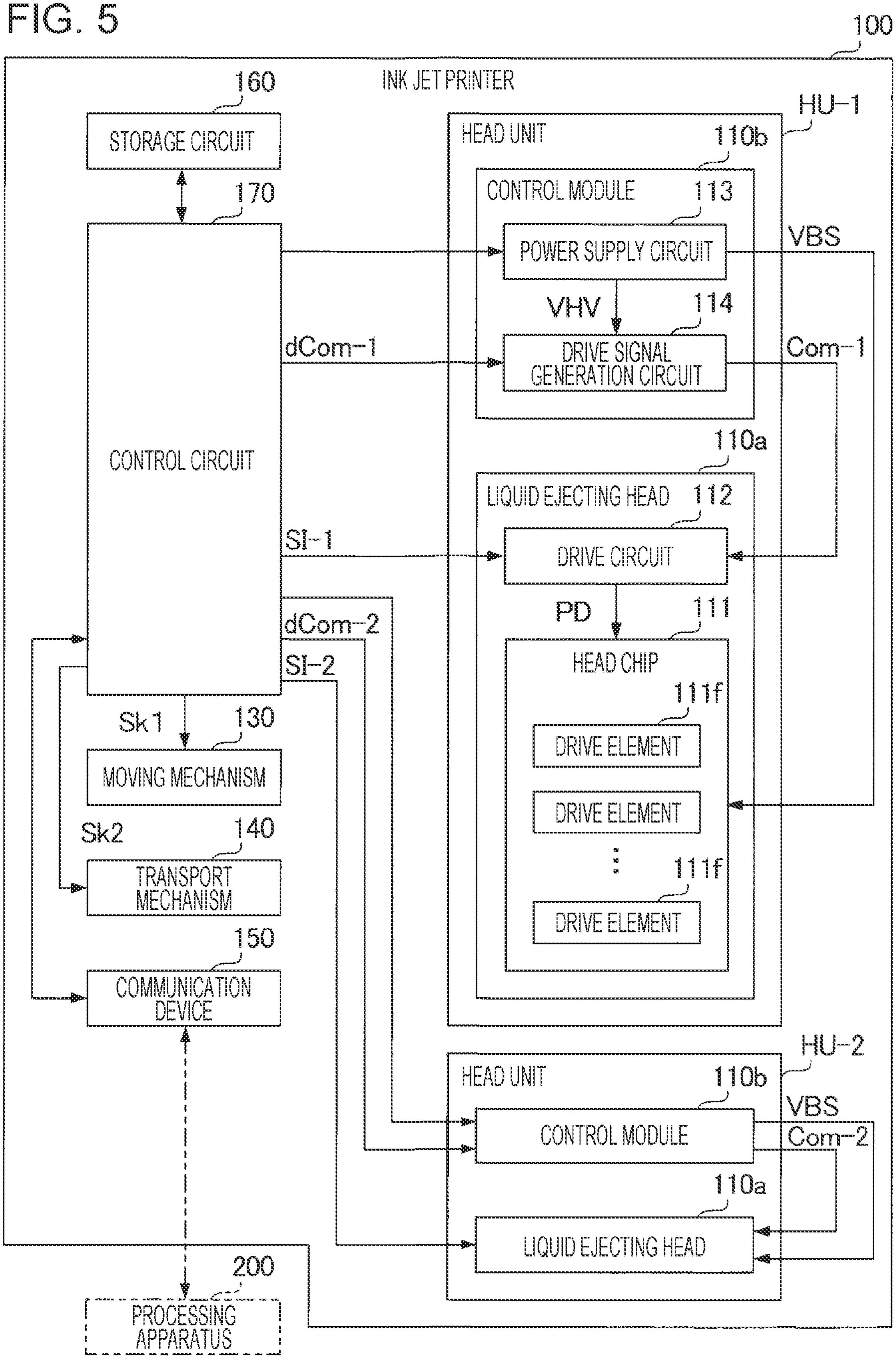
FIG. 5 is a block diagram showing a configuration example of the ink jet printer.

FIG. 4 is a schematic diagram illustrating an example of a configuration of the ink jet printer 100. FIG. 5 is a block diagram showing a configuration example of the ink jet printer 100. In the following description, an X-axis, a Y-axis, and a Z-axis which are orthogonal to each other are assumed. One direction along the X-axis when viewed from an optional point is referred to as an X1 direction, and a direction opposite to the X1 direction is referred to as an X2 direction. Similarly, directions opposite to each other along the Y-axis from an optional point are referred to as a Y1 direction and a Y2 direction, and directions opposite to each other along the Z-axis from an optional point are referred to as a Z1 direction and a Z2 direction. An X-Y plane including the X-axis and the Y-axis corresponds to a horizontal plane. The Z-axis is an axis along a vertical direction, and the Z2 direction corresponds to a downward direction in the vertical direction.

The ink jet printer 100 according to the first embodiment is a serial type liquid ejecting apparatus that reciprocates the head unit HU-1 and the head unit HU-2 along the X-axis. Specifically, as shown in FIG. 4, the ink jet printer 100 ejects ink from the nozzle N by transporting the recording medium PP in the Y1 direction, which is a sub-scanning direction, and moving the head unit HU in the X1 direction and the X2 direction, which are main scanning directions, thereby executing printing processing for forming an image at the recording medium PP. The recording medium PP is not particularly limited as long as it is a medium on which the ink jet printer 100 can print, and is, for example, various types of paper, various cloths, various films, and the like. In FIG. 4, some of the nozzles N among the plurality of nozzles N of the head unit HU are representatively illustrated.

As shown in FIGS. 4 and 5, the ink jet printer 100 includes a head unit HU-1, a head unit HU-2, a liquid container 120, a moving mechanism 130, a transport mechanism 140, a communication device 150, a storage circuit 160, and a control circuit 170. Hereinafter, the head unit HU-1 and the head unit HU-2 may be referred to as the head unit HU without distinguishing between them.

The head unit HU is an assembly having a head chip 111, a drive circuit 112, a power supply circuit 113, and a drive signal generation circuit 114. In the example of FIG. 5, the internal elements of the head unit HU-2 are appropriately omitted to avoid complication in the illustration.

In the example shown in FIG. 5, the head unit HU is divided into a liquid ejecting head 110*a* including the head chip 111 and the drive circuit 112, and a control module 110*b* including the power supply circuit 113 and the drive signal generation circuit 114. The head unit HU is not limited to the mode divided into the liquid ejecting head 110*a* and the control module 110*b*, and for example, a part or all of the control module 110*b* may be incorporated into the liquid ejecting head 110*a*.

The head chip 111 ejects ink toward the recording medium PP. In FIG. 5, among the components of the head chip 111, a plurality of drive elements 111*f* are representatively illustrated. A detailed example of the head chip 111 will be described later with reference to FIG. 6.

Under the control of the control circuit 170, the drive circuit 112 switches whether or not to supply a drive signal Com output from the drive signal generation circuit 114 to each of the plurality of drive elements 111*f* of the head chip 111 as a drive waveform PD. The drive circuit 112 includes, for example, a group of switches such as a transmission gate for the switching.

The power supply circuit 113 receives power supplied from a commercial power supply (not shown) and generates various predetermined potentials. The generated various potentials are appropriately supplied to each section of the ink jet printer 100. In the example shown in FIG. 5, the power supply circuit 113 generates a power supply potential VHV and an offset potential VBS. The offset potential VBS is supplied to the head chip 111 and the like. Also, the power supply potential VHV is supplied to the drive signal generation circuit 114 and the like.

The drive signal generation circuit 114 is a circuit that generates a drive signal Com for driving each drive element 111*f* of the head chip 111. Specifically, the drive signal generation circuit 114 includes, for example, a DA conversion circuit and an amplifier circuit. In the drive signal generation circuit 114, the DA conversion circuit converts a waveform designation signal dCom to be described later from the control circuit 170 from a digital signal to an analog signal, and the amplifier circuit generates a drive signal Com by amplifying the analog signal using the power supply potential VHV from the power supply circuit 113. Here, among the waveforms included in the drive signal Com, the signal of the waveform actually supplied to the drive element 111*f* is the drive waveform PD.

As shown in FIG. 5, the drive signal Com for driving each drive element 111*f* in the head unit HU-1 may be referred to as a drive signal Com-1, and the waveform designation signal dCom which is the basis of the drive signal Com-1 is sometimes referred to as a waveform designation signal dCom-1. Further, the drive signal Com for driving each drive element 111*f* in the head unit HU-2 may be referred to as a drive signal Com-2, and the waveform designation signal dCom which is the basis of the drive signal Com-2 is sometimes referred to as a waveform designation signal dCom-2. In the following, when the drive signal Com-1 and the drive signal Com-2 are not distinguished, the drive signal Com-1 and the drive signal Com-2 may be referred to as the drive signal Com, and when the waveform designation signal dCom-1 and the waveform designation signal dCom-2 are not distinguished, the waveform designation signal dCom-1 and the waveform designation signal dCom-2 may be referred to as the waveform designation signal dCom.

As illustrated in FIG. 4, the liquid container 120 that stores ink is installed in the ink jet printer 100. For example, a cartridge that is detachably attached to the ink jet printer 100, a bag-shaped ink pack formed of a flexible film, or an ink tank that can be replenished with ink is used as the liquid container 120. In the present embodiment, the liquid container 120 will be described on the assumption that two types of ink are stored. The liquid container 120 includes a liquid container 121 that stores the first type of ink and a liquid container 122 that stores the second type of ink. In the first embodiment, the first type of ink and the second type of ink are inks having different coloring materials from each other, for example. Also, the type of ink contained in the liquid container 120 is not limited to two types, and may be one type or three or more types. For example, the liquid container 120 may store four types of ink, namely, cyan ink, magenta ink, yellow ink, and black ink.

The moving mechanism 130 and the transport mechanism 140 move the relative positions of the recording medium PP and the two head units HU under the control of the control circuit 170.

The moving mechanism 130 reciprocates the two head units HU along the X-axis under the control of the control circuit 170. As shown in FIG. 4, the moving mechanism 130 includes a substantially box-shaped carriage 131 accommodating the head unit HU and an endless belt 132 to which the carriage 131 is fixed. A configuration in which the liquid container 120 is mounted on the carriage 131 together with the head unit HU may also be employed.

The transport mechanism 140 transports the recording medium PP in the Y1 direction under the control of the control circuit 170. Specifically, the transport mechanism 140 includes a transport roller (not shown) whose rotation axis is parallel to the X-axis, and a motor (not shown) that rotates the transport roller under control by the control circuit 170.

The communication device 150 is a circuit capable of communicating with the processing apparatus 200. For example, the communication device 150 is a network card such as USB or Bluetooth. Also, the communication device 150 may be integrated with the control circuit 170.

The storage circuit 160 stores various programs executed by the control circuit 170 and various types of data such as the recording data DP processed by the control circuit 170. The storage circuit 160 includes, for example, one or both semiconductor memories of one or more volatile memories such as a RAM and one or more non-volatile memories such as a ROM, an EEPROM, or a PROM. The storage circuit 160 may be configured as a part of the control circuit 170.

The control circuit 170 has a function of controlling the operation of each section of the ink jet printer 100 and a function of processing various types of data. The control circuit 170 includes, for example, a processor such as one or more CPUs. The control circuit 170 may include a programmable logic device such as an FPGA instead of or in addition to the CPU.

The control circuit 170 controls the operation of each section of the ink jet printer 100 by executing a program stored in the storage circuit 160. Here, the control circuit 170 generates signals such as a control signal Sk1, a control signal Sk2, a print data signal SI, and a waveform designation signal dCom as signals for controlling the operation of each section of the ink jet printer 100.

The control signal Sk1 is a signal for controlling driving of the moving mechanism 130. The control signal Sk2 is a signal for controlling driving of the transport mechanism 140. The print data signal SI is a signal for controlling driving of the drive circuit 112. Specifically, the print data signal SI designates whether or not the drive circuit 112 supplies the drive signal Com from the drive signal generation circuit 114 to the drive element 111*f* as the drive waveform PD for each predetermined unit period. By this designation, the amount of ink ejected from the head chip 111 and the like are designated. As shown in FIG. 5, the print data signal SI for controlling driving of the drive circuit 112 in the head unit HU-1 may be referred to as a print data signal SI-1 and the print data signal SI for controlling driving of the drive circuit 112 in the head unit HU-2 may be referred to as a print data signal SI-2. In the following, when the print data signal SI-1 and the print data signal SI-2 are not distinguished, the print data signal SI-1 and the print data signal SI-2 may be referred to as the print data signal SI. The waveform designation signal dCom is a digital signal for defining the waveform of the drive signal Com generated by the drive signal generation circuit 114.

Figure 6:
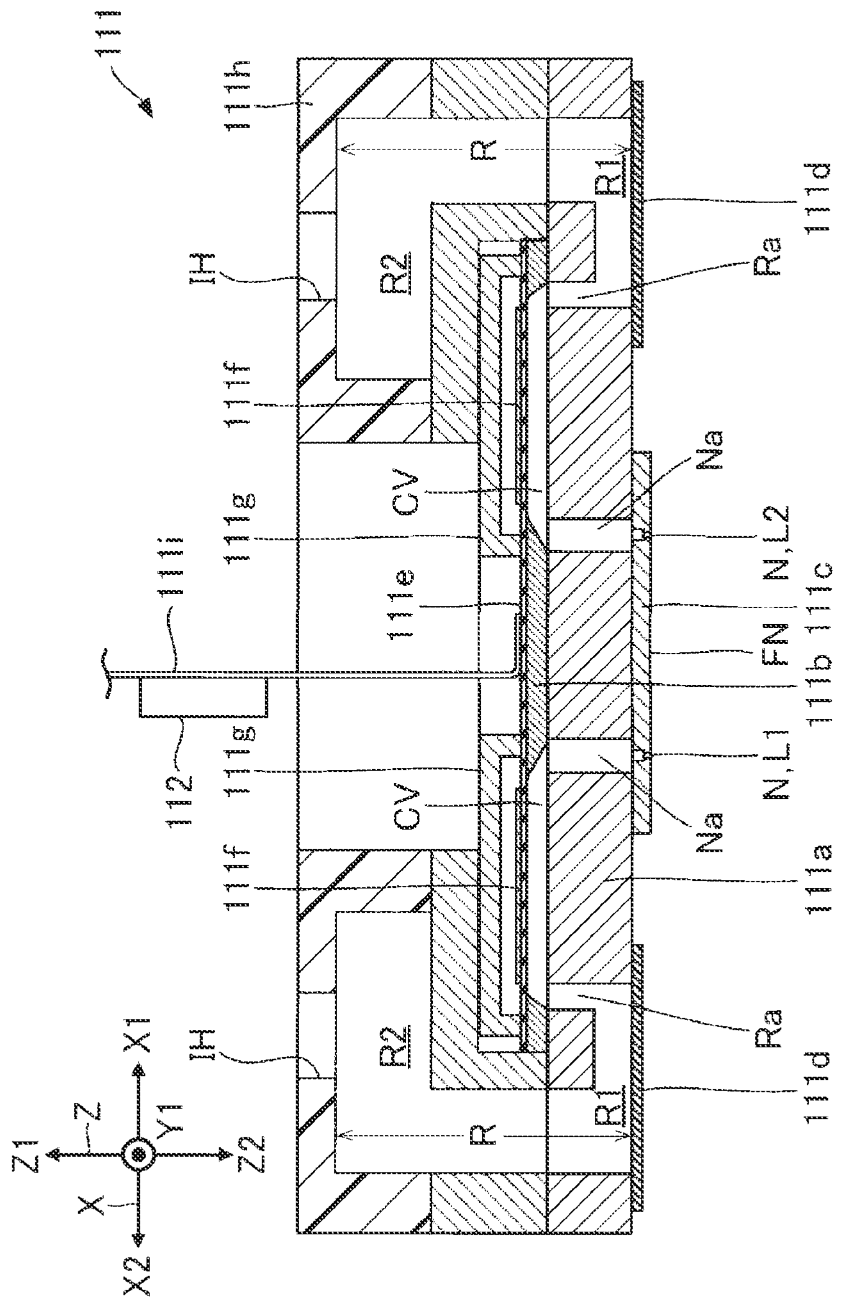
FIG. 6 is a cross-sectional view showing a configuration example of a head chip.

FIG. 6 is a cross-sectional view showing a configuration example of the head chip 111. Here, in FIG. 6, the drive circuit 112 is also shown in addition to the head chip 111.

As shown in FIG. 6, the head chip 111 has a plurality of nozzles N arranged in the direction along the Y-axis. The plurality of nozzles N are divided into a first row L1 and a second row L2 which are arranged at intervals in a direction along the X-axis. Each of the first row L1 and the second row L2 is a set of a plurality of nozzles N linearly arranged in a direction along the Y-axis.

The head chip 111 has a configuration substantially symmetrical with each other in the direction along the X-axis. However, positions of the plurality of nozzles N in the first row L1 and the plurality of nozzles N in the second row L2 in the direction along the Y-axis may match or differ from each other. FIG. 6 illustrates a configuration in which the positions of the plurality of nozzles N in the first row L1 and the plurality of nozzles N in the second row L2 match each other in the direction along the Y-axis.

As shown in FIG. 6, the head chip 111 includes a flow path substrate 111*a*, a pressure chamber substrate 111*b*, a nozzle plate 111*c*, vibration absorbers 111*d*, a vibration plate 111*e*, a plurality of drive elements 111*f*, protective plates 111*g*, a case 111*h*, and a wiring substrate 111.

The flow path substrate 111*a* and the pressure chamber substrate 111*b* are stacked in this order in the Z1 direction, and form a flow path for supplying ink to a plurality of nozzles N. The vibration plate 111*e*, the plurality of drive elements 111*f*, the protective plates 111*g*, the case 111*h*, and the wiring substrate 111*i* are installed in a region located in the Z1 direction with respect to a stacked body formed by the flow path substrate 111*a* and the pressure chamber substrate 111*b*. On the other hand, the nozzle plate 111*c* and the vibration absorbers 111*d* are installed in a region located in the Z2 direction with respect to the stacked body. Each element of the head chip 111 is schematically a plate-shaped member elongated in the Y direction, and is bonded to each other with, for example, an adhesive. Hereinafter, each element of the head chip 111 will be described in order.

The nozzle plate 111*c* is a plate-shaped member provided with the plurality of nozzles N of each of the first row L1 and the plurality of nozzles N of the second row L2. Each of the plurality of nozzles N is a through hole through which ink passes. Here, the surface of the nozzle plate 111*c* facing the Z2 direction is a nozzle surface FN. The nozzle plate 111*c* is manufactured by processing a silicon single crystal substrate by a semiconductor manufacturing technique using a processing technique such as dry etching or wet etching, for example. Here, other known methods and materials may be appropriately used for manufacturing the nozzle plate 111*c*. Further, the cross-sectional shape of the nozzle is typically a circular shape, but the shape is not limited thereto, and may be, for example, a non-circular shape such as a polygonal or elliptical shape.

The flow path substrate 111*a* is provided with a space R1, a plurality of supply flow paths Ra, and a plurality of communication flow paths Na for each of the first row L1 and the second row L2. The space R1 is an elongated opening extending in the direction along the Y-axis in a plan view in the direction along the Z-axis. Each of the supply flow path Ra and the communication flow path Na is a through hole formed for each nozzle N. Each supply flow path Ra communicates with the space R1.

The pressure chamber substrate 111*b* is a plate-shaped member provided with a plurality of pressure chambers CV referred to as cavities for each of the first row L1 and the second row L2. The plurality of pressure chambers CV are arranged in the direction along the Y-axis. Each pressure chamber CV is an elongated space formed for each nozzle N and extending in the direction along the X-axis in a plan view. Each of the flow path substrate 111*a* and the pressure chamber substrate 111*b* is manufactured by processing a silicon single crystal substrate by a semiconductor manufacturing technique, for example, in the same manner as the nozzle plate 111*c* described above. Here, other known methods and materials may be appropriately used for the manufacturing of each of the flow path substrate 111*a* and the pressure chamber substrate 111*b*.

The pressure chamber CV is a space located between the flow path substrate 111*a* and the vibration plate 111*e*. For each of the first row L1 and the second row L2, the plurality of the pressure chambers CV are arranged in the direction along the Y-axis. Further, the pressure chamber CV communicates with each of the communication flow path Na and the supply flow path Ra. Accordingly, the pressure chamber CV communicates with the nozzle N through the communication flow path Na and communicates with the space R1 through the supply flow path Ra.

The vibration plate 111*e* is arranged on the surface of the pressure chamber substrate 111*b* facing the Z1 direction. The vibration plate 111*e* is a plate-shaped member that can elastically vibrate. The vibration plate 111*e* has, for example, a first layer and a second layer, which are stacked in the Z1 direction in this order. The first layer is an elastic film made of silicon oxide ($SiO_2$), for example. The elastic film is formed, for example, by thermally oxidizing one surface of a silicon single crystal substrate. The second layer is an insulating film made of zirconium oxide ($ZrO_2$), for example. The insulating film is formed by, for example, forming a zirconium layer by sputtering and thermally oxidizing the layer. The vibration plate 111*e* is not limited to the above-mentioned stacked configuration of the first layer and the second layer, and may be composed of, for example, a single layer or three or more layers.

On the surface of the vibration plate 111*e* facing the Z1 direction, the plurality of drive elements 111*f* corresponding to the nozzles N are arranged for each of the first row L1 and the second row L2. Each drive element 111*f* is a passive element deformed by the drive signal Com being supplied. Each drive element 111*f* has an elongated shape extending in the direction along the X-axis in a plan view. The plurality of drive elements 111*f* are arranged in the direction along the Y-axis so as to correspond to the plurality of pressure chambers CV. The drive element 111*f* overlaps the pressure chamber CV in a plan view.

Each drive element 111*f* is a piezoelectric element, and although not shown, it has a first electrode, a piezoelectric layer, and a second electrode, which are stacked in the Z1 direction in this order. One electrode of the first electrode and the second electrode is an individual electrode arranged apart from the other for each drive element 111*f*, and the drive waveform PD is supplied to the one electrode. The other electrode of the first electrode and the second electrode is a strip-shaped common electrode extending in the direction along the Y-axis to be continuous over the plurality of drive elements 111*f*, and the offset potential VBS is supplied to the other electrode. Examples of metal materials of the electrodes include metal materials such as platinum (Pt), aluminum (Al), nickel (Ni), gold (Au), and copper (Cu), and among these, one type can be used alone, or two or more types can be used in combination in an alloy or stacked mode. The piezoelectric layer is made of a piezoelectric material such as lead zirconate titanate ($Pb(Zr, Ti)O_3$), and has, for example, a strip shape extending in the direction along the Y-axis to be continuous over the plurality of drive elements 111*f*. Here, the piezoelectric layer may be integrated over the plurality of drive elements 111*f*. In this case, the piezoelectric layer is provided with through holes extending in the direction along the X-axis, penetrating through the piezoelectric layer in regions corresponding to the gaps between the pressure chambers CV adjacent to each other in a plan view. When the vibration plate 111*e* vibrates in conjunction with the above deformation of the drive elements 111*f*, the pressures in the pressure chambers CV fluctuate, and ink is ejected from the nozzles N. That is, the drive element 111*f* generates energy for ejecting the ink. More specifically, the drive element 111*f* generates energy for vibrating the vibration plate 111*e*, and the ink in the pressure chamber CV is ejected from the nozzle N by the vibration of the vibration plate 111*e*. The drive element 111*f* is an example of an "energy generation element".

The protective plate 111*g* is a plate-shaped member installed on the surface of the vibration plate 111*e* facing the Z1 direction, and protects the plurality of drive elements 111*f* and reinforces the mechanical strength of the vibration plate 111*e*. Here, the plurality of drive elements 111*f* are accommodated between the protective plate 111*g* and the vibration plate 111*e*. The protective plate 111*g* is made of, for example, a resin material.

The case 111*h* is a member for storing ink supplied to the plurality of pressure chambers CV. The case 111*h* is made of, for example, a resin material. The case 111*h* is provided with a space R2 for each of the first row L1 and the second row L2. The space R2 is a space that communicates with the above-mentioned space R1 and functions as a reservoir R for storing ink supplied to the plurality of pressure chambers CV together with the space R1. An introduction port IH for supplying ink to each reservoir R is provided in the case 111*h*. The ink in each reservoir R is supplied to the pressure chamber CV through each supply flow path Ra.

The vibration absorber 111*d*, also referred to as a compliance substrate, is a flexible resin film constituting a wall surface of the reservoir R, and absorbs pressure fluctuations of ink in the reservoir R. The vibration absorber 111*d* may be a flexible thin plate made of metal. The surface of the vibration absorber 111*d* facing the Z1 direction is bonded to the flow path substrate 111*a* with an adhesive or the like.

The wiring substrate 111*i* is mounted on the surface of the vibration plate 111*e* facing the Z1 direction, and is a mounting component for electrically coupling the head chip 111, the drive circuit 112, the control module 110*b*, and the like. The wiring substrate 111*i* is, for example, a flexible wiring substrate such as a chip on film (COF), a flexible printed circuit (FPC), and a flexible flat cable (FFC).

1-5. Formation of Reference Color

In recent years, there has been a business model in which the head manufacturer provides the head unit HU to the printer manufacturer, and the printer manufacturer manufactures the ink jet printer 100 by incorporating the head unit HU into the printer main body. Here, in a general printer, a plurality of types of ink are combined to form a reference color. The reference color is a representative color generally recognized by humans. For example, reference colors are red, blue, green, purple, and yellow. In the present embodiment, processing is performed such that the reference color can be matched to a preferred color of the user U from a generally recognized color. However, the reference color is not limited to red, blue, green, purple, and yellow.

The ink jet printer 100 forms a reference color using one type of ink or a combination of two or more types of ink. A color formed by one type of ink is referred to as a primary color, and a color formed by combining two or more types of ink is referred to as a multicolor. The multicolors include a secondary color formed by combining two types of ink, a tertiary color formed by combining three types of ink, and the like. By forming dots of two or more types of ink, juxtaposed color mixture occurs, and the user U observes a multicolor corresponding to an area ratio of dots of two or more types of ink. Juxtaposed color mixture is that when an observer looks at dots of a plurality of colors juxtaposed at a distance of a certain distance or more, the plurality of juxtaposed colors appear to be mixed without being individually identified. Here, there may be a case where some or all of the dots of two or more types of ink overlap each other, and subtractive color mixture occurs at a place where some or all of the dots of two or more types of ink overlap each other. Subtractive color mixture is to obtain the color of the light that remains without being absorbed by a plurality of substances that absorb light of a specific color when the plurality of substances are superimposed.

When matching the reference color to the preference of the user U, various preferences of the user U may be considered. For example, even when the reference color is blue, a case where blue with a red tint is preferred, and a case where light blue is preferred are considered. In the following description, the color desired by the user U may be referred to as "desired color". For example, when the reference color is blue, the reference color is (R, G, B)=(0, 0, 255) when expressed by RGB values, and is (C, M, Y)=(255, 255, 0) when expressed by CMY values. When the desired color is blue with a magenta tint, as an example, the desired color is (R, G, B)=(51, 0, 255) when expressed by RGB values, and is (C, M, Y)=(204, 255, 0) when expressed by CMY values. Thus, although the desired color is different from the reference color, it is less likely that it will deviate greatly from the reference color. In the printing processing, an image is formed at the recording medium PP using a desired color.

In order to form a desired color preferred by the user U, a configuration can be employed in which the ink jet printer 100 prints a reference color once for trial and then selects or adjusts a desired color. However, it has been found that in a business model in which the head manufacturer provides the head unit HU to the printer manufacturer and the printer manufacturer incorporates the head unit HU into the printer main body, an excessive burden may occur on the user U in adjusting the desired color.

The head unit HU may have some manufacturing errors. Then, the ejection amounts of the two head units HU may differ from each other due to a manufacturing error. For example, even when the same drive signal Com is applied to each of the two head units HU, the shapes of the pressure chambers CV and the like may differ from each other due to a manufacturing error, and as a result, the ejection characteristics may differ from each other. When the head manufacturer manufactures the ink jet printer 100, it is possible to design the drive signal Com that offsets the manufacturing error, or generate the recording data DP that offsets the manufacturing error. However, since the printer manufacturer does not know how much manufacturing error occurs between the two head units HU, it has not been possible to offset the manufacturing error of the head units HU.

Furthermore, the type of ink used by the ink jet printer 100 is also determined by the printer manufacturer or the end user. Even due to the difference in the characteristics of the two types of ink, the ejection amounts of the same drive signal Com may differ from each other. For example, in two types of ink having different viscosities, the ejection amount of the high-viscosity ink tends to be smaller than the ejection amount of the low-viscosity ink. Since the head manufacturer does not know what kind of ink is used, it has not been possible to offset the difference in ink ejection amount.

Since the manufacturing error of each of the two head units HU and the characteristics of each of the two types of ink are unknown, when the reference color is printed for trial, the color formed on the recording medium PP may deviate greatly from the desired color of the user U. When the color formed on the recording medium PP deviates greatly from the desired color, there is a problem that the burden on the user U for adjusting the desired color becomes excessive.

Therefore, the processing apparatus 200 according to the first embodiment transmits, to the server 300, head information HI for specifying manufacturing errors of the two head units HU and ink information KI for specifying characteristics of each of the two types of ink, and obtains reference color information STI generated based on the head information HI and the ink information KI. The head information HI is an example of "first information", and the ink information KI is an example of "second information".

The reference color information STI is information for forming the reference color on the recording medium PP. Further, the reference color information STI is information for offsetting the manufacturing error of the two head units HU and the difference in the characteristics of the two types of ink. The reference color information STI according to the first embodiment is information including one or both information for adjusting the drive waveform PD applied to each drive element 111*f* of the head unit HU-1 and information for adjusting the drive waveform PD applied to each drive element 111*f* of the head unit HU-2. Information for adjusting the drive waveform PD is, for example, a waveform designation signal dCom indicating the drive waveform PD. In the following description, the reference color information STI according to the first embodiment is information including one or both of the waveform designation signal dCom indicating the drive waveform PD applied to each drive element 111*f* of the head unit HU-1 and a waveform designation signal dCom indicating the drive waveform PD applied to each drive element 111*f* of the head unit HU-2.

Figure 7:
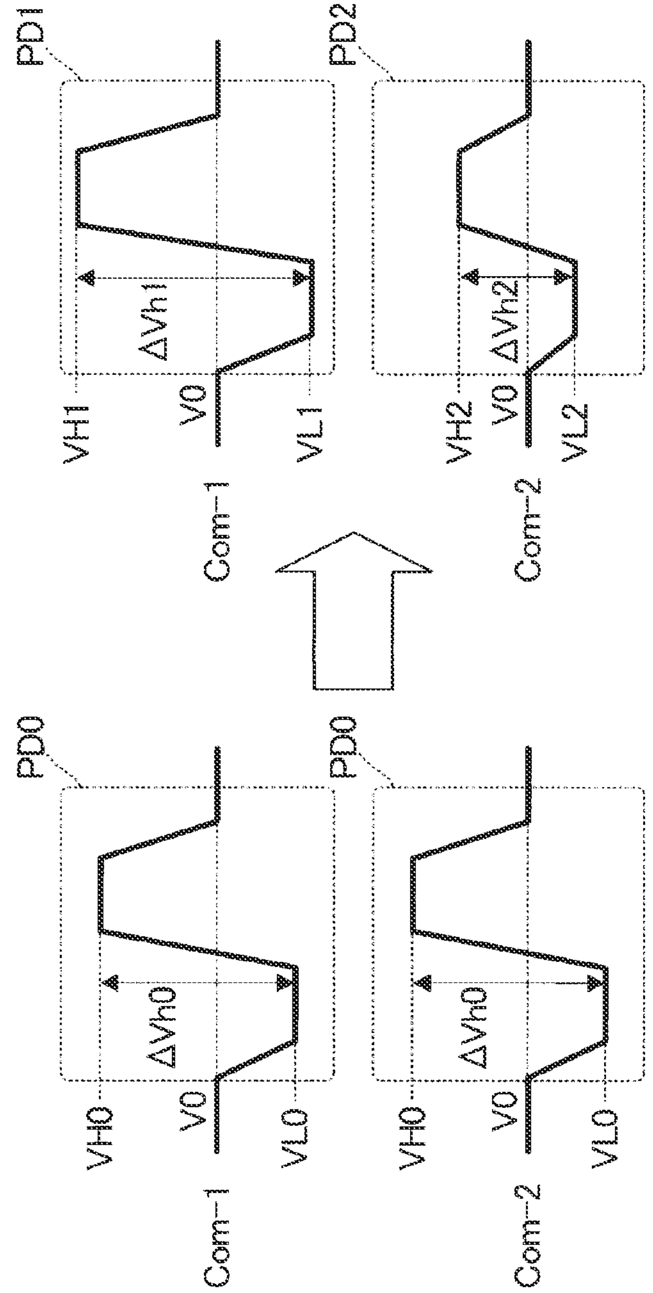
FIG. 7 is a diagram showing an example of a drive waveform before and after adjustment.

FIG. 7 is a diagram showing an example of the drive waveform PD before and after adjustment. The left side of FIG. 7 shows the drive signal Com-1 and the drive signal Com-2 before adjustment by the reference color information STI, and the right side of FIG. 7 shows the drive signal Com-1 and the drive signal Com-2 after adjustment by the reference color information STI. The drive signal Com-1 and the drive signal Com-2 have the same drive waveform PD0 before being adjusted by the reference color information STI. On the other hand, after the adjustment by the reference color information STI, the drive signal Com-1 has a drive waveform PD1 and the drive signal Com-2 has a drive waveform PD2. In the following description, the drive waveform PD0 before adjustment by the reference color information STI, and the drive waveform PD1 and the drive waveform PD2 after adjustment by the reference color information STI may be collectively referred to as the drive waveform PD.

In the example of FIG. 7, adjustment is made to increase the ejection amount of the head unit HU-1 and decrease the ejection amount of the head unit HU-2. As can be understood from FIG. 7, a potential difference ΔVh1 between a lowest potential VL1 and a highest potential VH1 of the drive waveform PD1 is larger than a potential difference ΔVh0 between a lowest potential VL0 and a highest potential VH0 of the drive waveform PD0. Further, the potential difference ΔVh2 between the lowest potential VL2 and the highest potential VH2 of the drive waveform PD2 is smaller than the potential difference ΔVh0. The ejection amount can be increased by increasing the potential difference between the lowest potential and the highest potential of the drive waveform PD, and the ejection amount can be reduced by decreasing the potential difference described above. Therefore, the ejection amount of the head unit HU-1 after adjustment is greater than the ejection amount of the head unit HU-1 before adjustment. The ejection amount of head unit HU-2 after adjustment is smaller than the ejection amount of head unit HU-2 before adjustment.

As can be understood from FIG. 7, in order to increase the ejection amount, the highest potential VH1 is higher than the highest potential VH0 and the lowest potential VL1 is lower than the lowest potential VL0, but the mode of adjustment for increasing the ejection amount is not limited thereto. For example, the highest potential may be increased while the lowest potential remains the same, or the lowest potential may be lowered while the highest potential remains the same. Similarly, in order to reduce the ejection amount, the highest potential VH2 is lower than the highest potential VH0 and the lowest potential VL2 is higher than the lowest potential VL0, but the mode of adjustment for reducing the ejection amount is not limited thereto. For example, the highest potential may be lowered while the lowest potential remains the same, or the lowest potential may be increased while the highest potential remains the same.

By using the reference color information STI, the processing apparatus 200 can reduce the burden on the user U for making adjustments to obtain the desired color desired by the user U. An example of adjustment for obtaining a desired color will be described with reference to FIG. 8.

Figure 8:
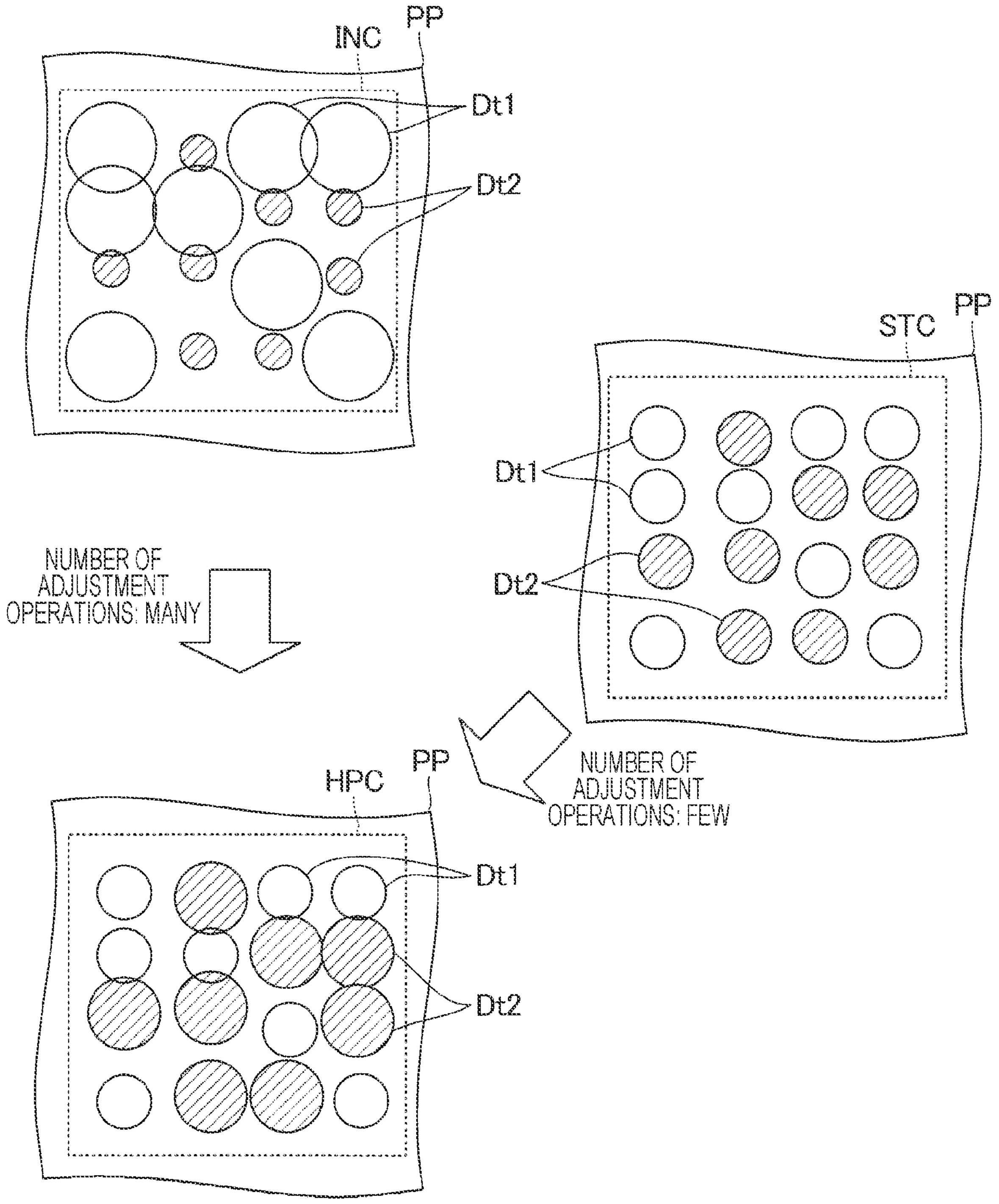
FIG. 8 is a diagram for describing an example of adjustment for obtaining a desired color.

FIG. 8 is a diagram for describing an example of adjustment for obtaining a desired color. A reference color STC shown in FIG. 8 is a secondary color formed by combining a first type of ink and a second type of ink. In the example of FIG. 8, it is assumed that the first type of ink is cyan ink, the second type of ink is magenta ink, and the reference color STC is blue. Further, a desired color HPC shown in FIG. 8 is a color desired by the user U. In the example of FIG. 8, it is assumed that the desired color HPC is blue with a magenta tint. An initial color INC shown in FIG. 8 is a color formed without any adjustment for manufacturing errors of the two head units HU and differences in the characteristics of each of the two types of ink. As shown in FIG. 8, the initial color INC, the reference color STC, and the desired color HPC are formed by a total of 16 dots, including eight cyan dots Dt1 formed by landing the first type of ink on the recording medium PP and eight magenta dots Dt2 formed by landing the second type of ink on the recording medium PP.

The initial color INC in FIG. 8 shows a state in which the ejection amount of the head unit HU-1 is greater than the ejection amount of the head unit HU-2, and the viscosity of the first type of ink is lower than the viscosity of the second type of ink. Therefore, in a state in which the manufacturing error of the two head units HU and the difference in the characteristics of each of the two types of ink are not adjusted at all, the dot Dt1 is larger than the dot Dt2 as indicated by the initial color INC. Therefore, the user U observes that the initial color INC is blue with a cyan tint.

On the other hand, as shown in the desired color HPC in FIG. 8, the user U desires blue with a magenta tint. In the case of FIG. 8, a color difference between the initial color INC and the desired color HPC is significantly different. In normal color adjustment, the initial color INC and test patches showing a plurality of slightly different colors based on the initial color INC are formed on the recording medium PP, and an adjustment operation of selecting a color close to the desired color HPC from among a plurality of colors is performed. Since the purpose is to finely adjust the color, the color based on this initial color INC has a small color difference from the initial color INC. However, in FIG. 8, since the color difference between the initial color INC and the desired color HPC is large, there is a concern that the colors based on the initial color INC created by normal color adjustment may not include a color sufficiently close to the desired color HPC. Then, next, it is necessary to perform the same adjustment operation again with the color closest to the desired color HPC among the colors based on the initial color INC as the next initial color INC. As a result, in order to obtain the desired color HPC from the initial color INC, it is necessary to repeat the adjustment operation a plurality of times.

This occurs when a color shift of the initial color INC derived from the head unit HU or the ink and a color shift of the desired color HPC preferred by the user U are in different color directions from each other. For example, in FIG. 8, this is caused by the fact that the initial color INC is blue with a cyan tint, and the desired color HPC is blue with a magenta tint, which are in different color directions. In view of this point, in the present embodiment, control is performed such that the color adjustment operation is performed after reducing the color shift of the initial color INC.

The reference color STC is ejected by the ink jet printer 100 according to the first embodiment, and is formed by the reference color information STI so that the manufacturing error of the two head units HU and the difference in the characteristics of each of the two types of ink are offset. In the example of FIG. 8, the reference color STC is blue because manufacturing errors of the two head units HU and differences in the characteristics of each of the two types of ink are offset. As described above, since the CMY value when the reference color is blue is (C, M, Y)=(255, 255, 0), that is, cyan and magenta are one to one, in the reference color STC, the size of the dot Dt1 of the cyan ink and the size of the dot Dt2 of the magenta ink are substantially the same.

In order to adjust from the reference color STC to the desired color HPC, the dot Dt2 only needs to be adjusted to be slightly larger. Specifically, the user U causes the ink jet printer 100 to form test patches showing a plurality of slightly different colors based on the reference color STC on the recording medium PP, and performs an adjustment operation of selecting a color close to the desired color HPC from among a plurality of colors. The desired color differs depending on the user U, but as described above, the desired color is unlikely to deviate significantly from the reference color. Thus, the number of adjustment operations of the user U for obtaining the desired color HPC from the reference color STC shown in FIG. 8 is less than the number of adjustment operations of the user U for obtaining the desired color HPC from the initial color INC. Accordingly, the ink jet system 10 according to the first embodiment can reduce the burden on the user U for making adjustments to obtain the desired color HPC, as compared with the mode of adjusting the initial color INC to the desired color HPC. Specific functions and operations of the ink jet system 10 will be described with reference to FIGS. 9 and 10.

1-6. Functions and Operations of Ink Jet System 10

Figure 9:
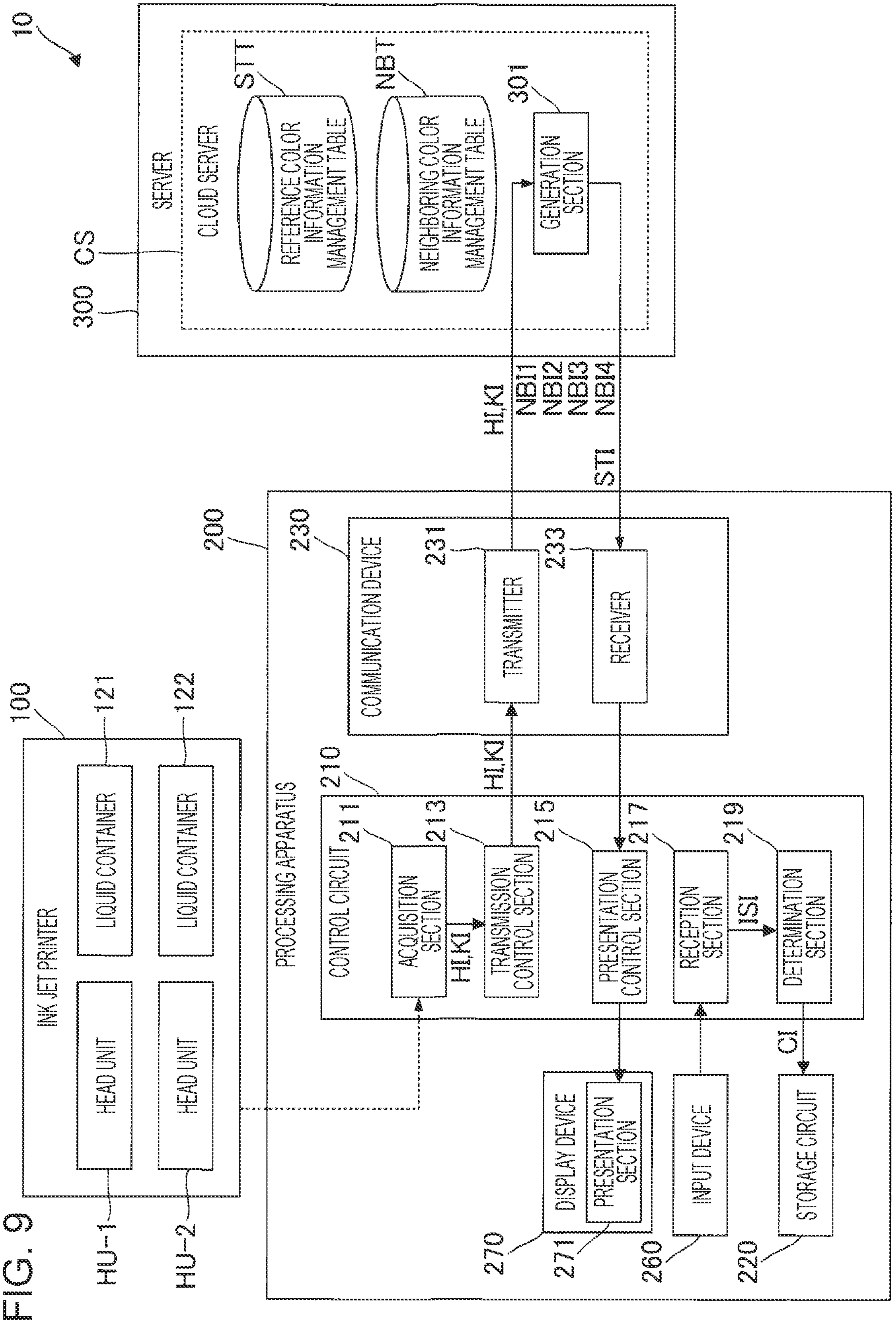
FIG. 9 is a diagram showing functions of the ink jet system.

FIG. 9 is a diagram showing the functions of the ink jet system 10. The server 300 reads the virtualization program VM and executes the read virtualization program VM to function as a cloud server CS. By reading the control program PM1 and executing the control program PM1 by the cloud server CS, the cloud server CS functions as a generation section 301. The control circuit 210 of the processing apparatus 200 reads the ink jet program PM2 and executes the read ink jet program PM2 to function as an acquisition section 211, a transmission control section 213, a presentation control section 215, a reception section 217, and a determination section 219. Further, the communication device 230 functions as a transmitter 231 and a receiver 233. Further, the display device 270 functions as a presentation section 271. When the server 300 does not function as the cloud server CS, the server 300 may function as the generation section 301 by executing the control program PM1. Each functional section will be described with reference to FIG. 10.

Figure 10:
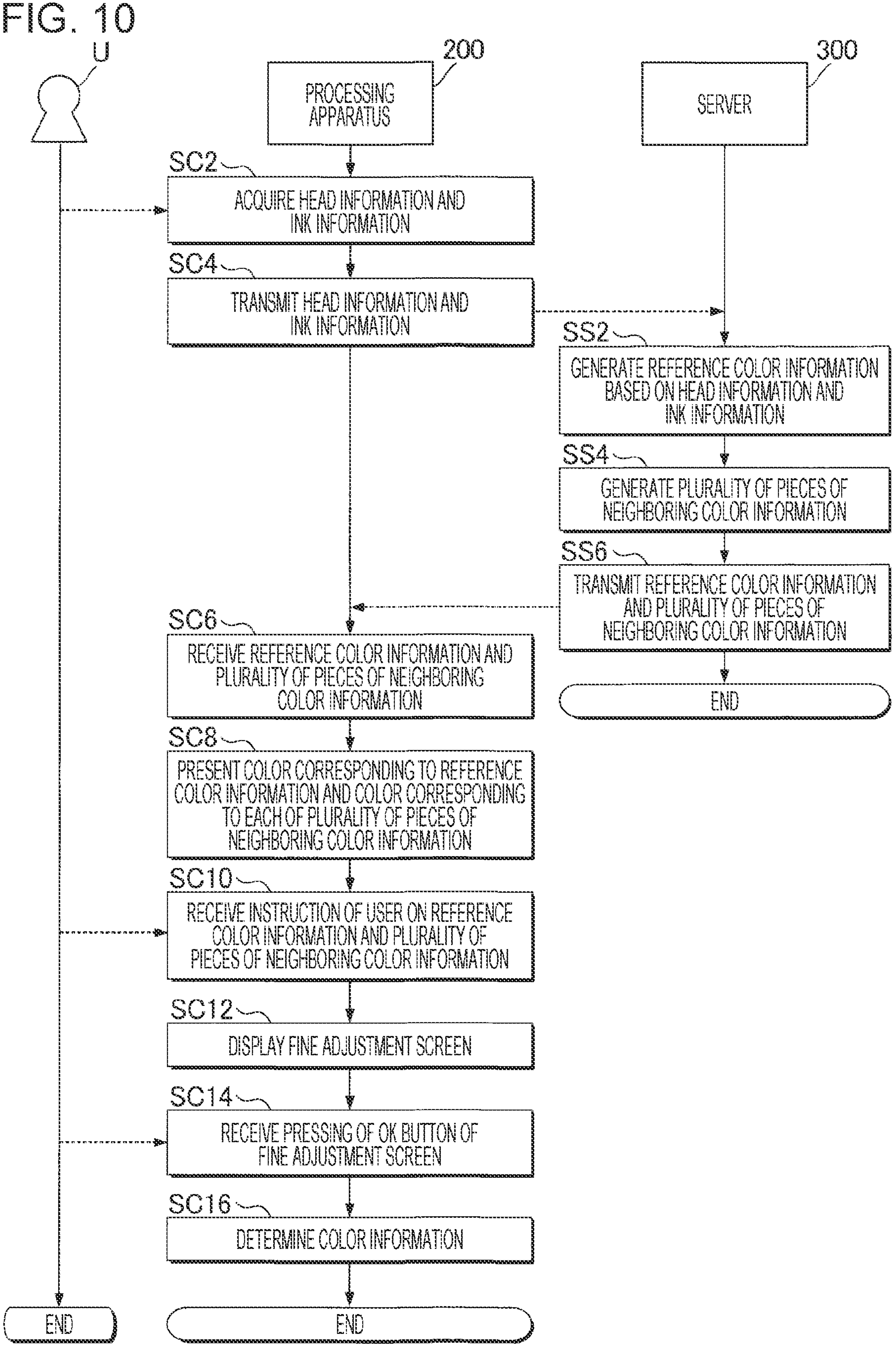
FIG. 10 is a flowchart showing an operation of the ink jet system.

FIG. 10 is a flowchart showing an operation of the ink jet system 10. Prior to the series of processes shown in FIG. 10, the processing apparatus 200 receives information regarding the reference color designated by the user U. The information regarding the reference color is, for example, an RGB value indicating the reference color designated by the user U. Here, the user U may not designate the reference color. In the present embodiment, a mode in which the user U designates a reference color will be described. The processing apparatus 200 stores image data for forming reference colors in order to generate the recording data DP. In the following description, for simplification of the description, description will be made on the assumption that the reference color designated by the user U is a secondary color, and the number of dots of the first type of ink and the number of dots of the second type of ink in the image data forming the reference color are the same.

In step SC2, the control circuit 210 that functions as the acquisition section 211 acquires ink information KI regarding two types of ink forming the reference color and head information HI regarding two head units HU ejecting the two types of ink. For simplification of description, the first embodiment shows that the ink jet printer 100 includes two head units HU and two types of ink, but when the ink jet printer 100 includes three or more head units HU and three or more types of ink, the control circuit 210 only needs to acquire the ink information KI regarding two types of ink forming the reference color and the head information HI regarding two head units HU ejecting the two types of ink among the three or more types of ink.

The head information HI is information regarding the head unit HU-1 and the head unit HU-2, and more specifically, includes information regarding the head unit HU-1 and information regarding the head unit HU-2. The information regarding the head unit HU-1 and the information regarding the head unit HU-2 are, for example, serial numbers of the head units HU-1 and HU-2, respectively. However, the information regarding the head unit HU-1 and the information regarding the head unit HU-2 are not limited to the serial numbers as long as the information can specify each head unit HU. The acquisition section 211 acquires the head information HI by causing the user U to input the serial number of each of the head units HU-1 and HU-2 by the input device 260. Alternatively, when a two-dimensional code indicating each serial number is printed on each housing of the head units HU-1 and HU-2, the two-dimensional code may be read by an imaging device such as a smartphone of the user U, and the acquisition section 211 may acquire the head information HI from the aforementioned imaging device.

The ink information KI is information regarding the first type of ink and the second type of ink, and more specifically, includes information regarding the first type of ink and information regarding the second type of ink. The information regarding the first type of ink is information that can specify the first type of ink, and is, for example, the model number of the first type of ink, the product name of the first type of ink, and the name of the manufacturer of the first type of ink. Similarly, the information regarding the second type of ink is information that can specify the second type of ink, and is, for example, the model number of the second type of ink, the product name of the second type of ink, and the name of the manufacturer of the second type of ink. In the following description, it is assumed that the information regarding the first type of ink is the model number of the first type of ink, and the information regarding the second type of ink is the model number of the second type of ink. The acquisition section 211 causes the user U to input the model number of the first type of ink and the model number of the second type of ink by the input device 260.

After the process of step SC2 is ended, in step SC4, the processing apparatus 200 transmits the head information HI and the ink information KI to the cloud server CS. Specifically, the control circuit 210 that functions as the transmission control section 213 controls the communication device 230 that functions as the transmitter 231 to transmit the head information HI and the ink information KI to the cloud server CS. More specifically, the control circuit 210 writes the head information HI, the ink information KI, and an address of the cloud server CS to the transmission buffer of the communication device 230. The communication device 230 refers to the address of the cloud server CS and transmits the head information HI and the ink information KI to the cloud server CS. The processing apparatus 200 waits for a response from the cloud server CS.

When the cloud server CS receives the head information HI and the ink information KI, in step SS2, the cloud server CS that functions as the generation section 301 generates the reference color information STI based on both the head information HI and the ink information KI. Specifically, the generation section 301 generates the reference color information STI based on a reference color information management table STT stored in a storage region of the cloud server CS, the head information HI, and the ink information KI. The reference color information management table STT will be described with reference to FIG. 11.

FIG. 11 is a diagram showing an example of contents of the reference color information management table STT. The reference color information management table STT is a table that stores the reference color information STI corresponding to the combination of the serial numbers of the two head units HU and the model numbers of the two types of ink. The reference color information management table STT shown in FIG. 11 stores reference color information STI corresponding to the serial numbers of two head units HU among the serial numbers of m head units HU, which are two or more, and the model numbers of two types of ink among the model numbers of n types of ink, which are two or more.

For example, the reference color information management table STT shown in FIG. 11 indicates that the reference color information STI corresponding to the case where the serial number of the head unit HU-1 is "hid-2", the model number of the first type of ink is "kid-2", the serial number of the head unit HU-2 is "hid-1", and the model number of the second type of ink is "kid-1" is reference color information STI-1. The reference color information STI-1 includes a waveform designation signal dCom-a indicating the drive waveform PD to be supplied to the plurality of drive elements 111*f* of the head unit HU-1 and a waveform designation signal dCom-b indicating the drive waveform PD to be supplied to the plurality of drive elements 111*f* of the head unit HU-2.

The reference color information management table STT is managed by the head manufacturer. According to an experiment or the like, the head manufacturer sets two waveform designation signals dCom that can offset the manufacturing error of the two head units HU and the difference in the characteristics of the two types of ink when one head unit HU of two head units HU ejects one of the two types of ink, and the other head unit HU ejects the other type of ink. The head manufacturer preferably updates the reference color information management table STT every time the head manufacturer sells a new head unit HU.

The generation section 301 generates the reference color information STI by acquiring the reference color information STI from the reference color information management table STT using the serial number of the head unit HU-1 and the serial number of the head unit HU-2 included in the head information HI and the model number of the first type of ink and the model number of the second type of ink included in the ink information KI. In addition, when one or both of the model number of the first type of ink and the model number of the second type of ink are not registered in the reference color information management table STT, the generation section 301 may notify the head manufacturer of an instruction to register the reference color information STI related to the unregistered model number of ink in the reference color information management table STT. As a notification method, for example, the generation section 301 transmits an email to a department that manages the reference color information management table STT in the head manufacturer, or notifies a server managed by the department.

The description will now return to FIG. 10. After the process of step SS2 is ended, in step SS4, the cloud server CS that functions as the generation section 301 generates a plurality of pieces of neighboring color information NBI based on the head information HI and the ink information KI. In the following description, the reference color information STI and the neighboring color information NBI may be collectively referred to as color information. The neighboring color information NBI is information for forming a neighboring color, which is a color neighboring the reference color, on the recording medium PP. For example, when the reference color is (R, G, B)=(0, 0, 255), the neighboring colors are (R, G, B)=(51, 0, 255), and (R, G, B)=(0, 51, 255). The neighboring colors are preferably separated to such an extent that the difference in color can be recognized by the human eye. In the present specification, when there are a reference color and a certain first color, the first color is assumed to be a range of the reference color when a color difference $\Delta E$ of CIELab 1976 between the reference color and the first color is 0.0 or more and less than 3.0, and the first color is assumed to be a neighboring color with respect to the reference color when the color difference $\Delta E$ is equal to or more than 3.0 and less than 10.0. A specific example of neighboring colors will be described with reference to FIG. 12.

Figure 12:
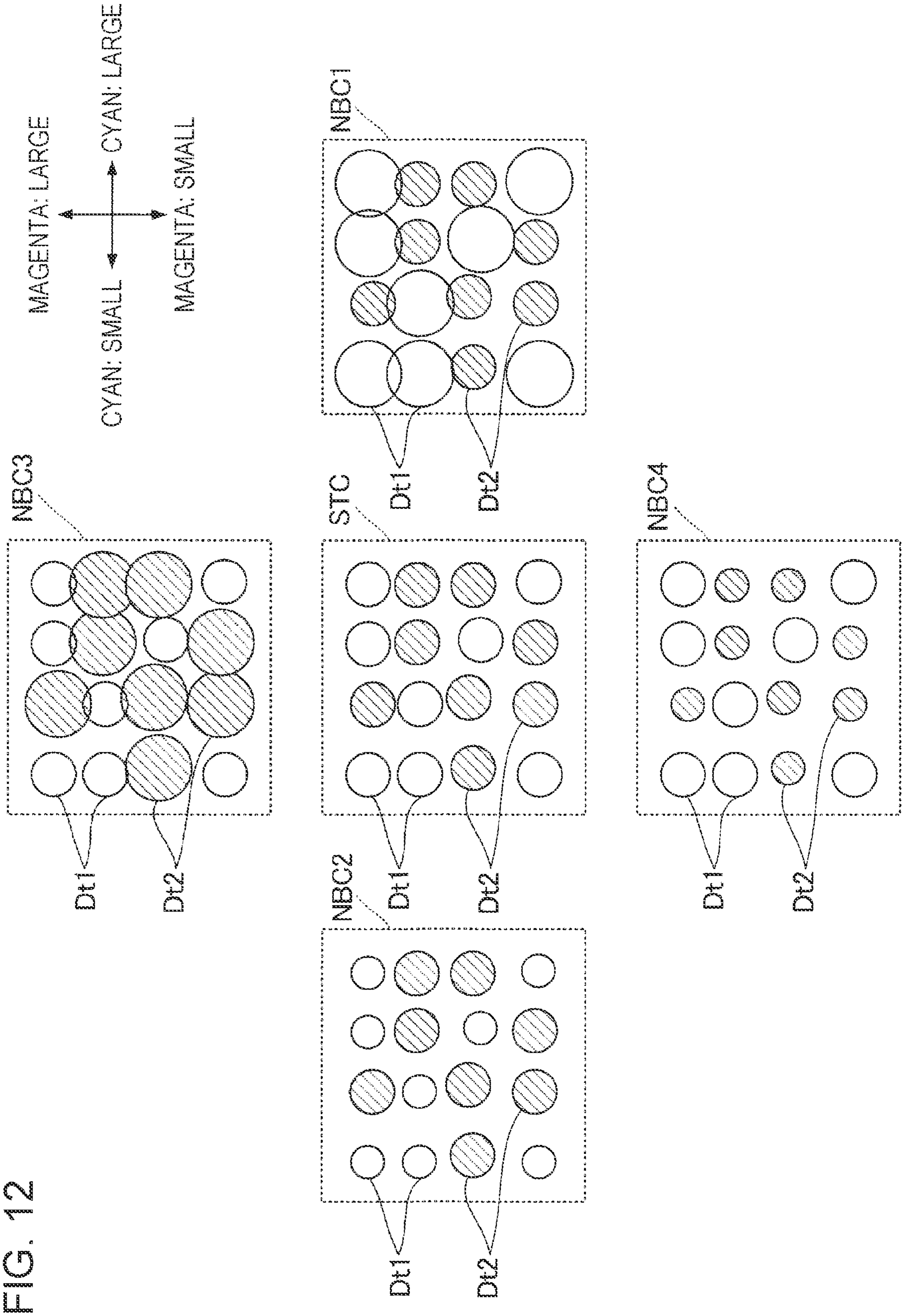
FIG. 12 is a diagram for describing an example of neighboring colors.

FIG. 12 is a diagram for describing an example of neighboring colors. In the example of FIG. 12, the generation section 301 generates neighboring color information NBI of each of a neighboring color NBC1, a neighboring color NBC2, a neighboring color NBC3, and a neighboring color NBC4 as four neighboring colors of the reference color STC. In the following description, the neighboring color NBC1, the neighboring color NBC2, the neighboring color NBC3, and the neighboring color NBC4 may be collectively referred to as a neighboring color NBC. The size of the dot Dt1 of the cyan ink of the neighboring color NBC1 is larger than the size of the dot Dt1 of the reference color STC. The size of the dot Dt1 of the neighboring color NBC2 is smaller than the size of the dot Dt1 of the reference color STC. The size of the dot Dt2 of the magenta ink of the neighboring color NBC3 is larger than the size of the dot Dt2 of the reference color STC. The size of the dot Dt2 of the neighboring color NBC4 is smaller than the size of the dot Dt2 of the reference color STC.

The generation section 301 generates neighboring color information NBI based on the head information HI and the ink information KI. In order to generate the neighboring color information NBI, the cloud server CS stores a neighboring color information management table NBT. Similarly to the reference color information management table STT, the neighboring color information management table NBT stores a plurality of pieces of neighboring color information NBI corresponding to combinations of serial numbers of the two head units HU and model numbers of the two types of ink. Using the example of FIG. 12, the plurality of pieces of neighboring color information NBI are neighboring color information NBI1 for forming the neighboring color NBC1, neighboring color information NBI2 for forming the neighboring color NBC2, neighboring color information NBI3 for forming the neighboring color NBC3, and neighboring color information NBI4 for forming the neighboring color NBC4. In the following description, the neighboring color information NBI1, the neighboring color information NBI2, the neighboring color information NBI3, and the neighboring color information NBI4 may be collectively referred to as the neighboring color information NBI. The generation section 301 generates the plurality of pieces of neighboring color information NBI by acquiring the plurality of pieces of neighboring color information NBI from the neighboring color information management table NBT using the serial number of the head unit HU-1 and the serial number of the head unit HU-2 included in the head information HI and the model number of the first type of ink and the model number of the second type of ink included in the ink information KI.

Any one piece of neighboring color information NBI among the plurality of pieces of neighboring color information NBI is an example of "first neighboring color information", and the neighboring color formed on the recording medium PP by the neighboring color information NBI is an example of a "first neighboring color". Further, the neighboring color information NBI that is different from the neighboring color information NBI that is the "first neighboring color information" among the plurality of pieces of neighboring color information NBI is an example of "second neighboring color information", and the neighboring color formed at the recording medium PP by the neighboring color information NBI is an example of a "second neighboring color".

In the example of FIG. 12, the generation section 301 generates the neighboring color information NBI of each of the four neighboring colors NBC, but the number of the generated pieces of neighboring color information NBI is not limited to four. For example, the generation section 301 may generate the neighboring color information NBI of one neighboring color in which the size of the dot Dt1 of the cyan ink is increased or decreased. Alternatively, although the generation section 301 generates the neighboring color information NBI for each of the four neighboring colors NBC in which the size of one of the dots of two types of ink forming the secondary color is increased or decreased, the generation section 301 may further generate neighboring color information NBI for each of the four neighboring colors NBC in which the sizes of both dots of the two types of ink forming the secondary color are increased or decreased. That is, the generation section 301 may generate neighboring color information NBI for each of a total of eight neighboring colors NBC.

The description will now return to FIG. 10. After the process of step SS4 is ended, in step SS6, the cloud server CS transmits the reference color information STI and the plurality of pieces of neighboring color information NBI to the processing apparatus 200.

In step SC6, the communication device 230 that functions as the receiver 233 receives the reference color information STI and the plurality of pieces of neighboring color information NBI from the cloud server CS. After the process of step SC6 is ended, in step SC8, the control circuit 210 that functions as the presentation control section 215 controls the display device 270 that functions as the presentation section 271 to present a color corresponding to the reference color information STI and a color corresponding to each of the plurality of pieces of neighboring color information NBI. A color corresponding to the reference color information STI is a color when the reference color STC is converted into an RGB value of the display device 270. The color corresponding to the reference color information STI may differ from the reference color STC depending on the color adjustment of the display device 270. Similarly, a color corresponding to each of the plurality of pieces of neighboring color information NBI is a color when each of the plurality of neighboring colors NBC is converted into an RGB value of the display device 270. A specific presentation method will be described with reference to FIG. 13.

Figure 13:
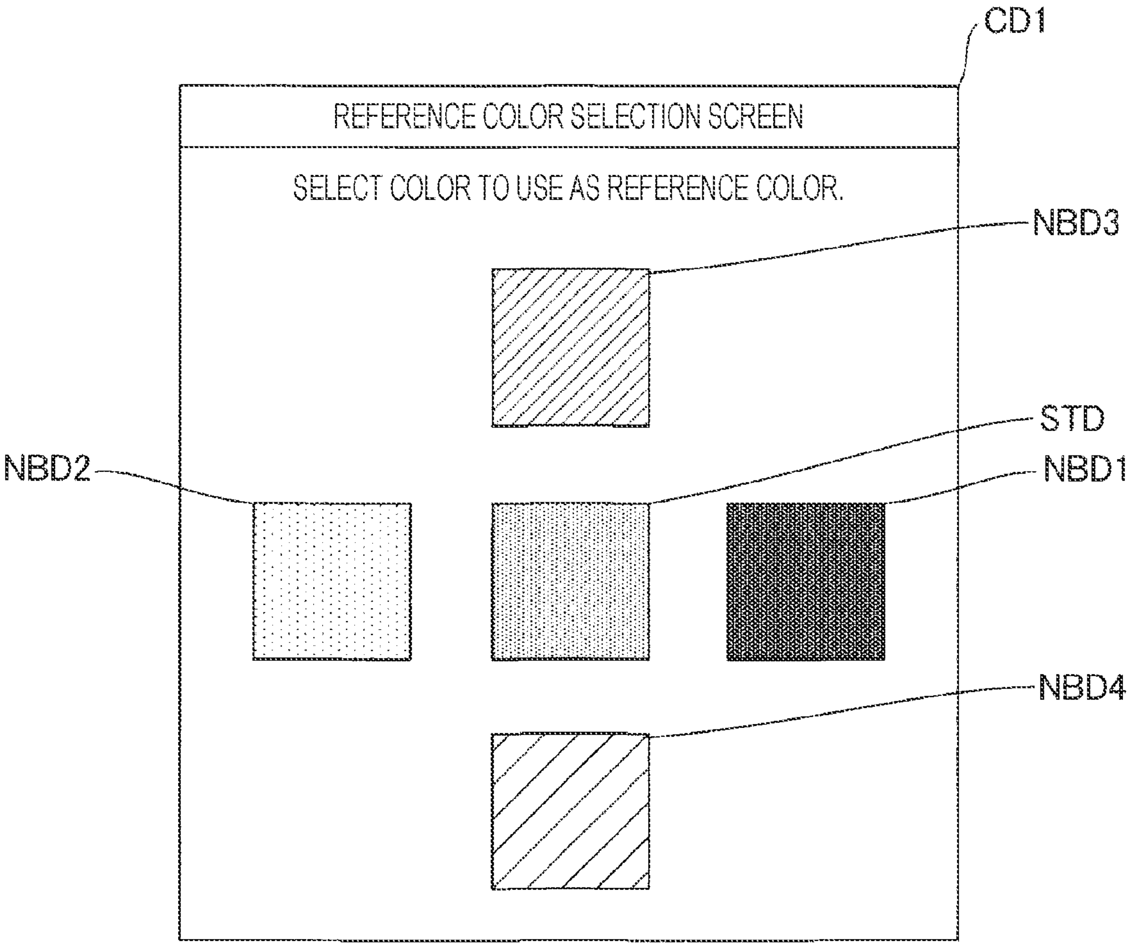
FIG. 13 is a diagram showing an example of presenting a color corresponding to reference color information and a color corresponding to each of a plurality of pieces of neighboring color information.

FIG. 13 is a diagram showing an example of presenting a color corresponding to the reference color information STI and a color corresponding to each of the plurality of pieces of neighboring color information NBI. By displaying a reference color selection screen CD1 on the display device 270, the control circuit 210 presents the user U with the color corresponding to the reference color information STI and the color corresponding to each of the plurality of pieces of neighboring color information NBI. The reference color selection screen CD1 shown in FIG. 13 includes an icon STD, an icon NBD1, an icon NBD2, an icon NBD3, and an icon NBD4.

The icon STD is an icon having a color corresponding to the reference color information STI for forming the reference color STC. The control circuit 210 only needs to indicate an RGB value of the reference color as the color corresponding to the reference color information STI. The icon NBD1 is an icon having a color corresponding to the neighboring color information NBI1 for forming the neighboring color NBC1 shown in FIG. 12. In order to calculate the RGB values of the colors corresponding to the neighboring color information NBI1, for example, the neighboring color information NBI1 includes information indicating the ratio of the ejection amounts of the respective inks. For example, the neighboring color information NBI1 includes information indicating 100% cyan:80% magenta. Since yellow is 0%, assuming that 100% is 255, the CMY value of the color corresponding to the neighboring color information NBI1 is (C, M, Y)=(255, 204, 0), and the RGB value thereof is (R, G, B)=(0, 51, 255). Similarly, the icon NBD2 is an icon having a color corresponding to the neighboring color information NBI2. The icon NBD3 is an icon having a color corresponding to the neighboring color information NBI3. The icon NBD4 is an icon having a color corresponding to the neighboring color information NBI4. Although the color corresponding to the reference color information STI, the color corresponding to the neighboring color information NBI1, the color corresponding to the neighboring color information NBI2, the color corresponding to the neighboring color information NBI3, and the color corresponding to the neighboring color information NBI4 are neighboring, the colors are different colors. In FIG. 13, the icon STD, the icon NBD1, the icon NBD2, the icon NBD3, and the icon NBD4 are shaded differently to indicate that the icon STD, the icon NBD1, the icon NBD2, the icon NBD3, and the icon NBD4 have different colors.

After the process of step SC8 is ended, in step SC10, the control circuit 210 that functions as the reception section 217 receives an instruction of the user U on the reference color information STI and the plurality of pieces of neighboring color information NBI. Specifically, the user U operates the input device 260 to select an icon of color information corresponding to a color closest to a desired color from among the reference color information STI and the plurality of pieces of neighboring color information NBI. In the following description, the color information selected by the user U among the reference color information STI and the plurality of pieces of neighboring color information NBI may be referred to as "selected color information". The control circuit 210 receives the icon of the selected color information selected by the user U as an instruction of the user U.

After the process of step SC10 is ended, in step SC12, the control circuit 210 displays a fine adjustment screen CD2 in order to receive adjustment information ISI for adjusting the selected color information.

Figure 14:
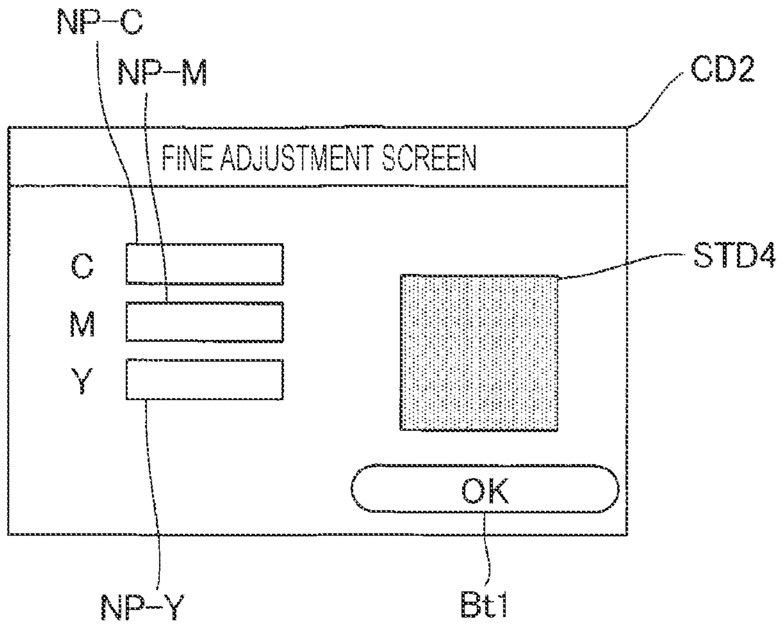
FIG. 14 is a diagram showing an example of a fine adjustment screen.

FIG. 14 is a diagram showing an example of the fine adjustment screen CD2. The fine adjustment screen CD2 includes an icon STD4, an input field NP-C for inputting a value of cyan, an input field NP-M for inputting a value of magenta, an input field NP-Y for inputting a value of yellow, and an OK button Bt1. The icon STD4 is the same as the icon selected by the user U in step SC10 in an initial state of the fine adjustment screen CD2. In the input field NP-C, the input field NP-M, and the input field NP-Y, the CMY value of the color corresponding to the icon selected by the user U in step SC10 is set. When the value of any one of the input field NP-C, the input field NP-M, and the input field NP-Y is changed, the color of the icon STD4 is updated to the color indicated by the CMY value corresponding to the changed value.

The fine adjustment screen CD2 is not limited to the mode shown in FIG. 14. For example, the fine adjustment screen CD2 may have a black input field.

The description will now return to FIG. 10. After the process of step SC12 is ended, in step SC14, the control circuit 210 that functions as the reception section 217 receives the pressing of the OK button Bt1 of the fine adjustment screen CD2. The CMY values indicated by the input field NP-C, the input field NP-M, and the input field NP-Y at the time when the OK button Bt1 is pressed are the adjustment information ISI for adjusting the selected color information. When the user U presses the OK button Bt1, in step SC16, the control circuit 210 that functions as the determination section 219 determines color information to be used for printing processing based on the adjustment information ISI received by the reception section 217. Specifically, the control circuit 210 determines the CMY values indicated by the input field NP-C, the input field NP-M, and the input field NP-Y at the time when the OK button Bt1 of the fine adjustment screen CD2 is pressed as color information CI to be used for printing processing. The control circuit 210 stores the color information CI used for the printing processing in the storage circuit 220. After the process of step SC16 is ended, the ink jet system 10 ends a series of processes shown in FIG. 10.

It is preferable that the flowchart shown in FIG. 10 is executed each time one or both of the head information HI and the ink information KI are updated. Until one or both of the head information HI and the ink information KI are updated, the control circuit 210 determines the color information CI stored in the storage circuit 220 as the color information to be used for the printing processing, and when one or both of the head information HI and the ink information KI are updated, in step SC4, the control circuit 210 transmits the updated head information HI and ink information KI to the server 300. The wording "When one or both of the head information HI and the ink information KI are updated" refers to when one or both of the head unit HU-1 and the head unit HU-2 are replaced, or when one or both of the liquid container 121 and the liquid container 122 are replaced. After the process of step SC4 is ended, the control circuit 210 executes a series of processes shown in FIG. 10 and overwrites the color information CI stored in the storage circuit 220 with the color information CI determined in step SC16.

1-7. Summary of First Embodiment

As described above, the ink jet system 10 according to the first embodiment is an ink jet system capable of communicating with the server 300, and the ink jet system includes: the head unit HU-1 that ejects the first type of ink onto the recording medium PP; the head unit HU-2 that ejects the second type of ink onto the recording medium PP; the acquisition section 211 that acquires both of the head information HI regarding the head unit HU-1 and the head unit HU-2, and the ink information KI regarding the first type of ink and the second type of ink; the transmitter 231 that transmits both of the head information HI and the ink information KI to the server 300; and the receiver 233 that receives, from the server 300, the reference color information STI for forming the reference color STC on the recording medium PP, which is generated based on both of the head information HI and the ink information KI.

In the ink jet system 10 according to the first embodiment, since the manufacturing error of the two head units HU and the difference in the characteristics of the two types of ink can be offset by the reference color information STI, the burden on the user U for making adjustments to obtain the desired color can be reduced as compared with the mode in which the unadjusted initial color is adjusted to the desired color.

In addition, the ink jet system 10 according to the first embodiment includes the server 300, and further includes the generation section 301 that generates the reference color information STI based on the head information HI and the ink information KI in the server 300.

The ink jet system 10 according to the first embodiment can offset the manufacturing error of the two head units HU and the difference in the characteristics of the two types of ink based on the head information HI and the ink information KI.

In addition, the generation section 301 generates the reference color information STI including both of the waveform designation signal dCom which is information for adjusting the drive waveform PD applied to the drive element **111*f* provided in the head unit HU-1 and the waveform designation signal dCom which is information for adjusting the drive waveform PD applied to the drive element 111*f* provided in the head unit HU-2** based on both of the head information HI and the ink information KI.

According to the first embodiment, since the reference color information STI includes the waveform designation signal dCom which is information for adjusting the drive waveform PD, the manufacturing error of the two head units HU and the difference in the characteristics of the two types of ink can be offset by making the size of the dots of the first type of ink substantially the same as the size of the dots of the second type of ink.

Further, the receiver 233 further receives, from the server 300, the neighboring color information NBI1 for forming the neighboring color NBC1 which is a color neighboring the reference color STC on the recording medium PP, which is generated based on one or both of the head information HI and the ink information KI.

Since the ink jet system 10 according to the first embodiment receives the neighboring color information NBI1 in addition to the reference color information STI, the user U can select a color closer to the desired color from the reference color STC and the neighboring color NBC1. Therefore, the burden on the user U for making adjustments to obtain the desired color can be reduced as compared with the mode of adjusting the reference color STC to the desired color.

In addition, the receiver 233 further receives, from the server 300, the neighboring color information NBI2 for forming the neighboring color NBC2 which is a color neighboring the reference color STC and is different from the neighboring color NBC1 on the recording medium PP, which is generated based on both of the head information HI and the ink information KI.

Since the ink jet system 10 according to the first embodiment receives the neighboring color information NBI2 in addition to the reference color information STI and the neighboring color information NBI1, the burden on the user U for making adjustments to obtain the desired color can be reduced as compared with the mode of selecting a color closer to the desired color from the reference color STC and the neighboring color NBC1. That is, it is possible to reduce the burden on the user U for making adjustments to obtain a desired color in accordance with increasing the number of neighboring colors NBC.

Further, the head unit HU-1 ejects the first type of ink onto the recording medium PP and the head unit HU-2 ejects the second type of ink onto the recording medium PP to execute printing processing for forming an image on the recording medium PP, and the ink jet system 10 further includes: the presentation section 271 that presents the user U with a color corresponding to the reference color information STI received by the receiver; the reception section 217 that receives an instruction of the user U on the reference color information STI; and the determination section 219 that determines color information to be used for the printing processing based on a result received by the reception section 217.

The ink jet system 10 according to the first embodiment can reflect a desired color in the printing processing.

In addition, the reception section 217 receives the adjustment information ISI for adjusting the selected color information from the user, and the determination section 219 determines the color information CI to be used for printing processing based on the adjustment information ISI. When the selected color information is the reference color information STI, the reception section 217 receives the adjustment information ISI for adjusting the reference color information STI from the user U.

According to the first embodiment, the user U can bring the color formed by the selected color information closer to the desired color by adjusting the selected color information.

Further, the ink jet system 10 further includes the storage circuit 220 that stores the color information CI determined by the determination section, the determination section 219 determines the color information CI stored in the storage circuit 220 as the color information CI to be used for the printing processing until the acquisition section 211 acquires one or both of the updated head information HI and ink information KI, and after acquiring both of the updated head information HI and ink information KI, the transmitter 231 transmits both of the updated head information HI and ink information KI to the server 300.

According to the first embodiment, when one or both of the head unit HU-1 and the head unit HU-2 are replaced, or when one or both of the liquid container 121 and the liquid container 122 are replaced, the color information CI used for printing processing can be updated.

Further, the head information HI includes information regarding the head unit HU-1 and information regarding the head unit HU-2.

According to the first embodiment, since the head information HI includes information regarding the head unit HU-1 and information regarding the head unit HU-2, the manufacturing error between the head unit HU-1 and the head unit HU-2 can be offset.

In addition, the ink information KI includes information regarding the first type of ink and information regarding the second type of ink.

According to the first embodiment, since the ink information KI includes information regarding the first type of ink and information regarding the second type of ink, the difference in characteristics between the first type of ink and the second type of ink can be offset.

Further, the first type of ink and the second type of ink are inks of different colors from each other, and the reference color is a multicolor.

According to the first embodiment, the multicolor can be set as the desired color of the user U. However, the ink jet system 10 according to the first embodiment can also handle a case where the first type of ink and the second type of ink are inks of the same color, that is, a primary color.

2. Second Embodiment

The reference color information STI according to the first embodiment is information for adjusting the drive waveform PD in order to adjust the size of one dot, but the present disclosure is not limited thereto. For example, the reference color can be adjusted by changing the number of dots of the first type of ink and the number of dots of the second type of ink among the plurality of dots forming the reference color. A second embodiment will be described below.

Figure 15:
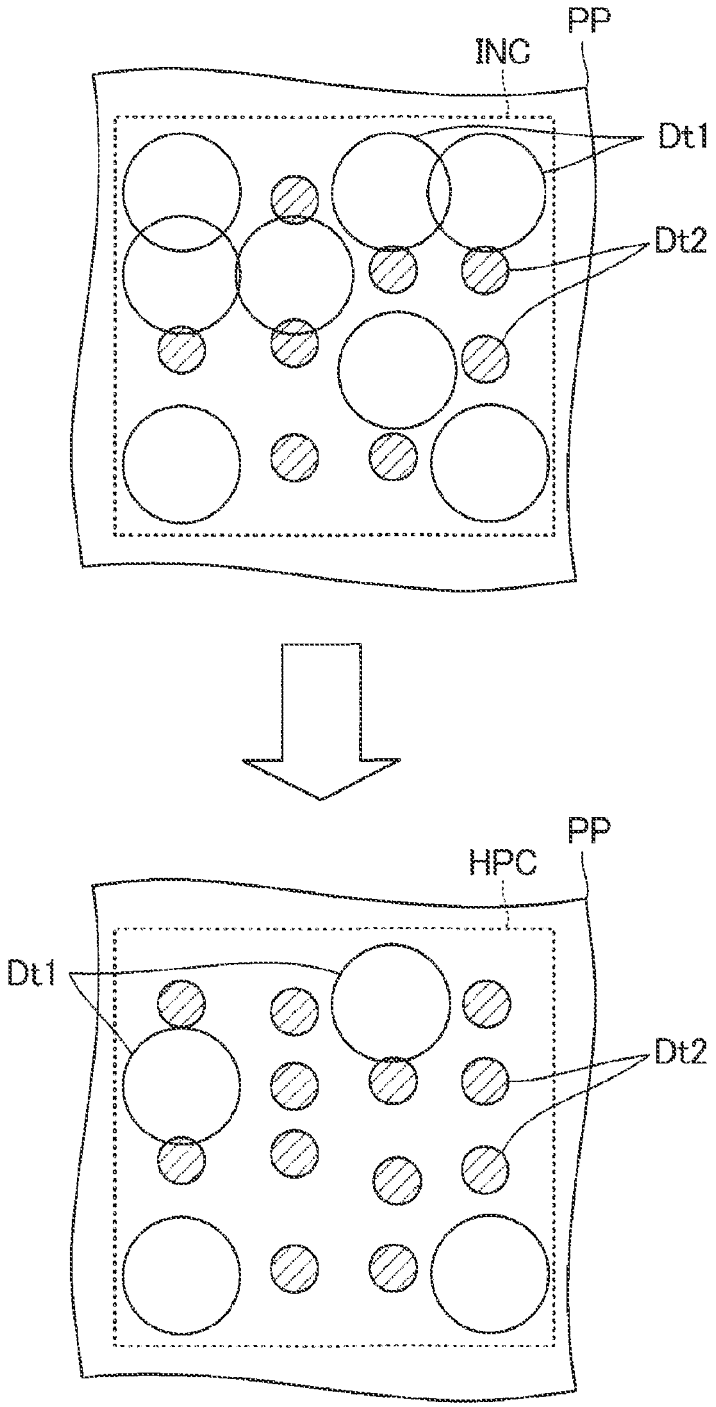
FIG. 15 is a diagram for describing an adjustment example of a reference color according to a second embodiment.

FIG. 15 is a diagram for describing an adjustment example of a reference color according to the second embodiment. An initial color INC shown in FIG. 15 is the same as the initial color INC shown in FIG. 8. A desired color HPC shown in FIG. 15 indicates a color desired by the user U. Since the user U desires blue with a magenta tint, the user U adjusts the number of dots Dt2 to be greater than the number of dots Dt1. In the example of FIG. 15, the number of dots Dt2 is 12, and the number of dots Dt1 is four. As the number of magenta dots Dt2 increases, the area of magenta becomes larger than the area of the cyan. Therefore, the desired color HPC can have a large amount of magenta components as compared with the initial color INC.

FIG. 16 is a diagram showing an example of the reference color information STI according to the second embodiment. As a method of changing the number of dots of the first type of ink and the number of dots of the second type of ink among the plurality of dots forming the reference color, the reference color information STI according to the second embodiment includes one or both of the information for adjusting the image processing performed on the image data corresponding to the head unit HU-1 and the information for adjusting the image processing performed on the image data corresponding to the head unit HU-2. The image data corresponding to the head unit HU-1 is data indicating an image formed by the head unit HU-1 ejecting the first type of ink in the recording data DP. Similarly, the image data corresponding to the head unit HU-2 is data indicating an image formed by the head unit HU-2 ejecting the second type of ink in the recording data DP. The information for adjusting the image processing has, for example, the following three modes. In a first mode, the information for adjusting the image processing is information for adjusting a lookup table used in color conversion processing included in the image processing. In a second mode, the information for adjusting the image processing is information for adjusting information indicating a dither pattern used in RIP processing included in the image processing. In a third mode, the information for adjusting the image processing is information for adjusting information indicating an error diffusion matrix used in the RIP processing included in the image processing. In FIG. 16, the information for adjusting the image processing is described as the information for adjusting a lookup table.

FIG. 16 shows a lookup table LT1 before adjustment and a lookup table LT2 after adjustment. The difference between the lookup table LT1 and the lookup table LT2 is that the CMY value after conversion of (R, G, B)=(0, 0, 128) are adjusted from (C, M, Y)=(128, 128, 0) to (C, M, Y)=(172, 64, 0). The information for adjusting the image processing is the lookup table LT2 after adjustment or an updated portion of the lookup table LT2 after adjustment. When the information for adjusting the image processing is the updated portion of the lookup table LT2 after adjustment, the information indicating the position of the updated portion, for example, the row number of the updated portion is also included in the reference color information STI according to the second embodiment.

For example, the reference color information management table STT according to the second embodiment stores the reference color information STI according to the second embodiment corresponding to the combination of the serial numbers of the two head units HU and the model numbers of the two types of ink. The generation section 301 according to the second embodiment generates the reference color information STI according to the second embodiment based on the reference color information management table STT according to the second embodiment, the head information HI, and the ink information KI.

In the second embodiment as well, as in the first embodiment, the determination section 219 stores the reference color information STI according to the second embodiment in the storage circuit 220 as color information to be used for printing processing. For example, when the reference color information STI according to the second embodiment is an updated portion of the lookup table LT2 after adjustment, the determination section 219 updates the lookup table stored in the storage circuit 220 with the reference color information STI according to the second embodiment.

2-1. Summary of Second Embodiment

As described above, the generation section 301 according to the second embodiment generates the reference color information STI including one or both of the information for adjusting the image processing performed on the image data corresponding to the head unit HU-1 and the information for adjusting the image processing performed on the image data corresponding to the head unit HU-2 based on both of the head information HI and the ink information KI.

According to the second embodiment, since the reference color information STI includes the information for adjusting the image processing, the manufacturing error of the two head units HU and the difference in the characteristics of the two types of ink can be offset by changing the number of dots of the first type of ink and the number of dots of the second type of ink.

Comparing the first embodiment and the second embodiment, in the second embodiment, since the size of the dots of the first type of ink and the size of the dots of the second type of ink are different, there is a concern that a bias in arrangement of the color of the first type of ink and the color of the second type of ink occurs within the reference color, making it difficult for the juxtaposed color mixture to occur. When the juxtaposed color mixture does not occur, there is a concern that the user U will be able to identify the colors of the two types of ink individually. On the other hand, in the first embodiment, since the size of the dots of the first type of ink and the size of the dots of the second type of ink are substantially the same, the bias in the arrangement of the color of the first type of ink and the color of the second type of ink is suppressed within the reference color. Therefore, the ink jet system 10 according to the first embodiment can easily generate juxtaposed color mixture as compared with the ink jet system 10 according to the second embodiment, and can provide high-quality reference colors.

On the other hand, it is difficult for the ink jet system 10 according to the first embodiment to adjust a plurality of reference colors. For example, when the adjustment mode of the drive waveform PD is different between a first reference color and a second reference color, in order to form both the first reference color and the second reference color on the recording medium PP in one predetermined unit period in the printing processing, for example, it is necessary that the drive signal generation circuit 114 outputs two systems of drive signals Com, one system of drive signal Com is adjusted to the drive waveform PD of the first reference color, and the other system of drive signal Com is adjusted to the drive waveform PD of the second reference color. That is, the same number of systems of drive signals Com as the number of reference colors to be simultaneously formed in one predetermined unit period are required. On the other hand, in the second embodiment, since the recording data DP is adjusted by image processing, even when adjusting a plurality of reference colors, the drive signal generation circuit 114 does not need to output two systems of drive signals Com, and only needs to output one system of drive signal Com. Therefore, the ink jet system 10 according to the second embodiment can easily adjust a plurality of reference colors as compared with the ink jet system 10 according to the first embodiment.

3. Modification Example

Each form exemplified above can be variously modified. A specific mode of modification is exemplified below. Any two or more modes selected from the following examples can be combined as appropriate as long as there is no contradiction.

3-1. First Modification Example

In each of the above-described modes, the reception section 217 may receive acceptance/rejection information indicating whether or not to employ the reference color information STI from the user U.

Figure 17:
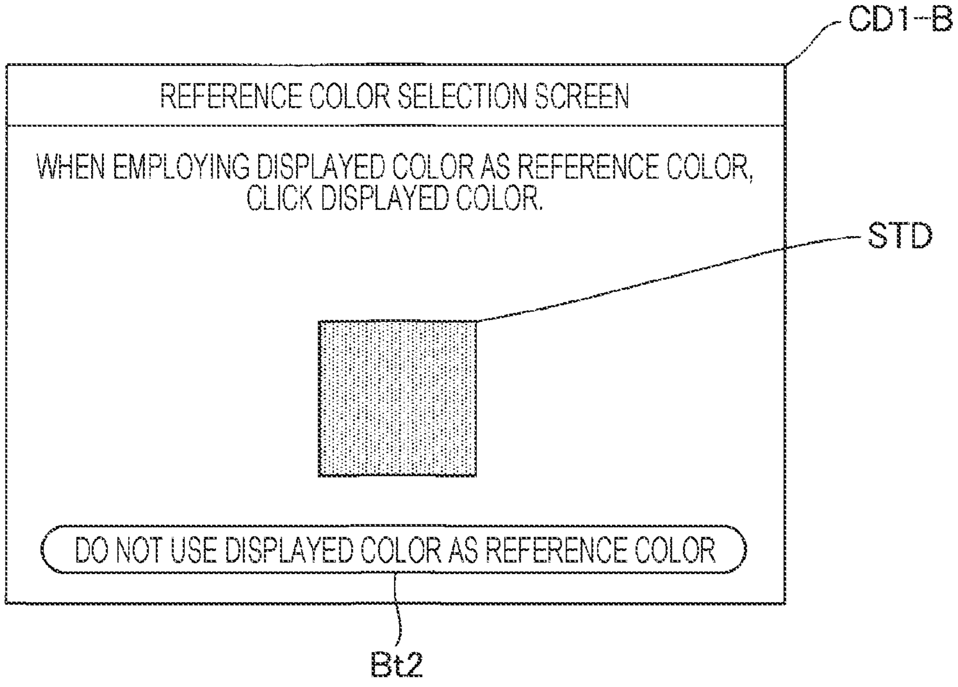
FIG. 17 is a diagram showing a reference color selection screen according to a first modification example.

FIG. 17 is a diagram showing a reference color selection screen CD1-B according to a first modification example. The reference color selection screen CD1-B differs from the reference color selection screen CD1 in that it has a button Bt2 and does not have the icon NBD1, the icon NBD2, the icon NBD3, and the icon NBD4.

In the first modification example, since the icon NBD1, the icon NBD2, the icon NBD3, and the icon NBD4 are not provided, the neighboring color information NBI is not generated. That is, in each of the above-described modes, the generation section 301 may not generate the neighboring color information NBI.

The button Bt2 is pressed when the user U determines that the displayed color is not used as the reference color, that is, the reference color information STI is not employed. When the icon STD is pressed by the user U, the reception section 217 receives the acceptance/rejection information indicating that the reference color information STI is employed. On the other hand, when the button Bt2 is pressed, the reception section 217 receives the acceptance/rejection information indicating that the reference color information STI is not employed.

When the acceptance/rejection information indicates that the reference color information STI is employed, the determination section 219 determines the reference color information STI as the color information CI to be used for the printing processing. On the other hand, when the acceptance/rejection information indicates that the reference color information STI is not employed, the determination section 219 does not determine the reference color information STI as color information to be used for the printing processing. For example, the control circuit 210 notifies the server 300 of an instruction to generate the neighboring color information NBI. The control circuit 210 presents the user U with a color corresponding to the neighboring color information. Alternatively, the control circuit 210 may display a screen for causing the user U to input the CMY value indicating the reference color.

As described above, the reception section 217 according to the first modification example receives the acceptance/rejection information indicating whether or not to employ the reference color information STI from the user U, and the determination section 219 determines the reference color information STI as the color information CI to be used for the printing processing when the acceptance/rejection information indicates that the reference color information STI is to be employed.

According to the first modification example, when the user U selects to employ the reference color information STI, the reference color information STI can be determined as the color information CI to be used for the printing processing.

3-2. Second Modification Example

In each of the above-described modes, before the series of processes shown in FIG. 10, the processing apparatus 200 has received the information regarding the reference color designated by the user U, but may not receive the information regarding the reference color. For example, in step SS2, the cloud server CS may specify the reference color based on the head information HI and the ink information KI. The reference color information management table STT in a second modification example stores the information regarding the reference color and the reference color information STI according to the combination of the serial numbers of the two head units HU and the model numbers of the two types of ink. In step SS6, the cloud server CS transmits the information regarding the reference color, the reference color information STI, and the plurality of pieces of neighboring color information NBI to the processing apparatus 200.

In step SC6, the communication device 230 receives the information regarding the reference color, the reference color information STI, and the plurality of pieces of neighboring color information NBI from the cloud server CS. In step SC8, the control circuit 210 presents a color corresponding to the reference color information STI and a color corresponding to each of the plurality of pieces of neighboring color information NBI, but only needs to present the color corresponding to the reference color information STI based on the information regarding the reference color received in step SC6.

3-3. Third Modification Example

In the second embodiment and each modification example based on the second embodiment, instead of the piezoelectric element, the drive element 111*f* may employ a heating element that converts electrical energy into thermal energy, generates air bubbles inside the pressure chamber CV by heating, and changes the pressure inside the pressure chamber CV The heating element may be, for example, an element that generates heat by supplying the drive signal Com.

3-4. Fourth Modification Example

In each of the above-described modes, the acquisition section 211 may acquire only one of the head information HI and the ink information KI. For example, when the acquisition section 211 acquires only the head information HI, the generation section 301 generates the reference color information STI based on the head information HI.

Since the manufacturing error between the head unit HU-1 and the head unit HU-2 can be offset by generating the reference color information STI based on the head information HI, the burden on the user U for making adjustments to obtain a desired color can be reduced as compared with a mode in which manufacturing errors in the two head units HU and differences in the characteristics of the two types of ink are not adjusted. However, in a fourth modification example, the difference in the characteristics of the two types of ink cannot be offset. Therefore, the ink jet system 10 according to the first embodiment can further reduce the burden on the user U for making adjustments to obtain a desired color, as compared with the ink jet system 10 according to the fourth modification example.

3-5. Fifth Modification Example

Similarly to the fourth modification example, when the acquisition section 211 acquires only the ink information KI, the generation section 301 generates the reference color information STI based on the ink information KI.

Since the difference in the characteristics of the two types of ink can be offset by generating the reference color information STI based on the ink information KI, the burden on the user U for making adjustments to obtain a desired color can be reduced as compared with the mode in which manufacturing errors in the two head units HU and differences in the characteristics of the two types of ink are not adjusted. However, in a fifth modification example, the manufacturing error between the head unit HU-1 and the head unit HU-2 cannot be offset. Therefore, the ink jet system 10 according to the first embodiment can further reduce the burden on the user U for making adjustments to obtain a desired color, as compared with the ink jet system 10 according to the fifth modification example.

3-6. Sixth Modification Example

In each of the above-described modes, the serial type ink jet printer 100 in which the head unit HU is reciprocated in the direction along the X-axis has been exemplified, but the present disclosure is not limited to such a mode. The ink jet printer 100 may be a line type liquid ejecting apparatus in which a plurality of nozzles N are distributed over the entire width of the recording medium PP.

3-7. Seventh Modification Example

The ink jet system 10 according to each mode described above includes the server 300, but may not include the server 300.

Figure 18:
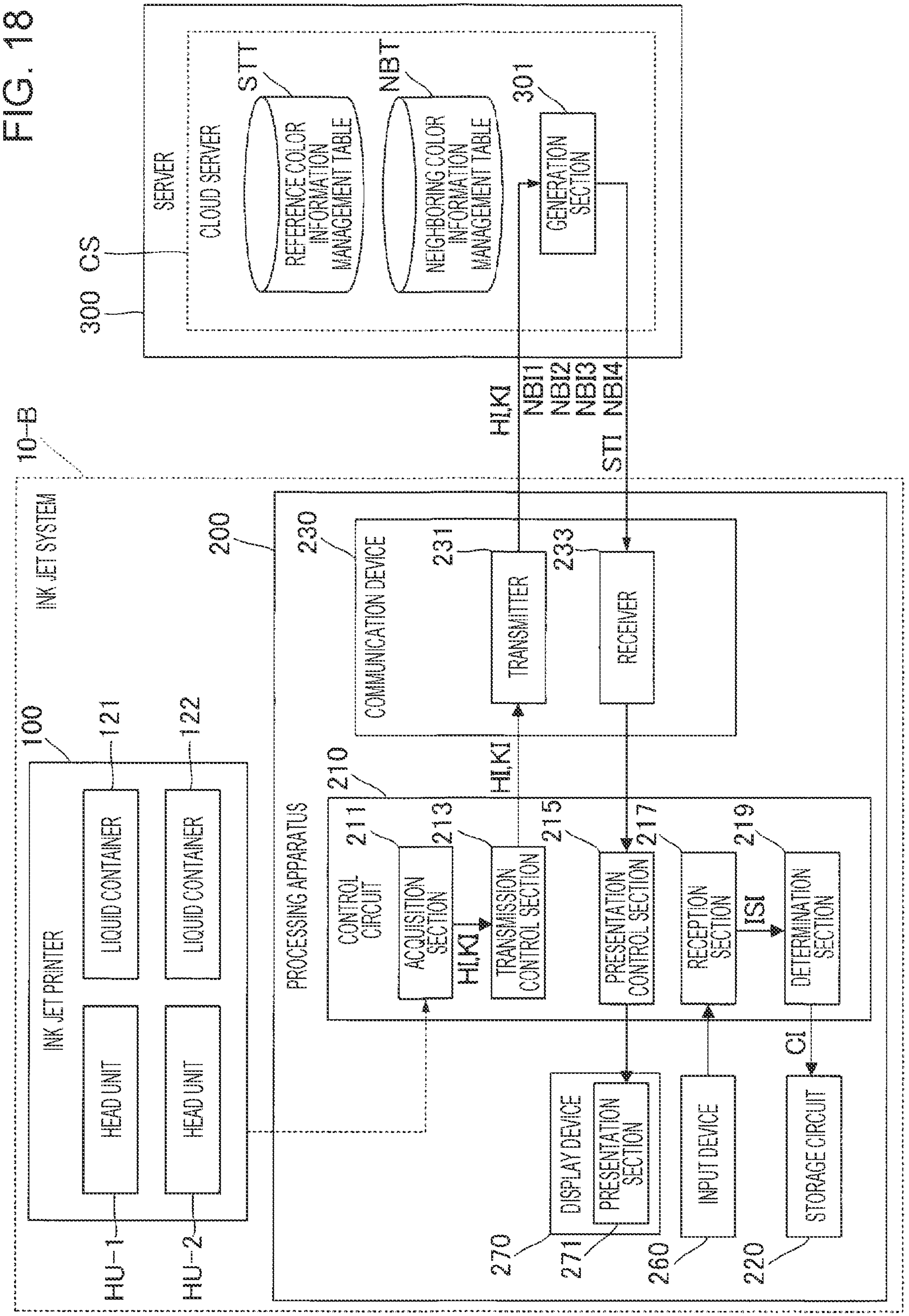
FIG. 18 is a diagram showing a function of an ink jet system according to a seventh modification example.

FIG. 18 is a diagram showing a function of an ink jet system 10-B according to a seventh modification example. The ink jet system 10-B differs from the ink jet system 10 in that it does not include the server 300. The ink jet system 10-B can communicate with the server 300.

3-8. Eighth Modification Example

The ink jet system 10 according to each of the above-described modes includes the processing apparatus 200, but may not include the processing apparatus 200. The ink jet printer 100 according to the seventh modification example includes an input device, a display device, and the communication device 230 capable of communicating with the server 300. A program similar to the ink jet program PM2 is stored in the storage circuit 160 according to an eighth modification example. The control circuit 170 according to the eighth modification example reads the above-described program and executes the read program to function as the acquisition section 211, the transmission control section 213, the presentation control section 215, the reception section 217, and the determination section 219.

3-9. Ninth Modification Example

Each of the plurality of modes described above can be employed in various devices such as a facsimile machine and a copier, in addition to a device dedicated to printing. However, the application of use of the liquid ejecting apparatus of the present disclosure is not limited to printing. For example, a liquid ejecting apparatus that ejects a solution of a coloring material is used as a manufacturing device forming a color filter of a liquid crystal display device. In addition, a liquid ejecting apparatus that ejects a solution of a conductive material is used as a manufacturing device for forming wiring and electrodes of a wiring substrate.

What is claimed is:

1. An ink jet system configured to communicate with a server, the ink jet system comprising:
- a first head unit that ejects a first type of ink onto a recording medium;
- a second head unit that ejects a second type of ink onto the recording medium;
- an acquisition section that acquires first information regarding the first head unit and the second head unit;
- a transmitter that transmits the first information to the server; and
- a receiver that receives, from the server, reference color information for forming a reference color on the recording medium, which is generated based on the first information.

2. The ink jet system according to claim 1, wherein the server further comprises a generation section that generates the reference color information based on the first information and is provided in the server.

3. The ink jet system according to claim 2, wherein the generation section generates the reference color information including one or both of information for adjusting a drive waveform applied to an energy generation element provided in the first head unit and information for adjusting a drive waveform applied to an energy generation element provided in the second head unit based on the first information.

4. The ink jet system according to claim 2, wherein the generation section generates the reference color information including one or both of information for adjusting image processing performed on image data corresponding to the first head unit and information for adjusting image processing performed on image data corresponding to the second head unit based on the first information.

5. The ink jet system according to claim 1, wherein the receiver further receives, from the server, first neighboring color information for forming a first neighboring color which is a color neighboring the reference color on the recording medium, which is generated based on the first information.

6. The ink jet system according to claim 5, wherein the receiver further receives, from the server, second neighboring color information for forming a second neighboring color which is a color neighboring the reference color and is different from the first neighboring color on the recording medium, which is generated based on the first information.

7. The ink jet system according to claim 1, wherein
- the first head unit ejects the first type of ink onto the recording medium and the second head unit ejects the second type of ink onto the recording medium to execute printing processing for forming an image on the recording medium, and
- the ink jet system further comprises:
  - a presentation section that presents a user with a color corresponding to the reference color information received by the receiver;
  - a reception section that receives an instruction of the user on the reference color information; and
  - a determination section that determines color information to be used for the printing processing based on a result received by the reception section.

8. The ink jet system according to claim 7, wherein
- the reception section receives acceptance/rejection information indicating whether or not to employ the reference color information from the user, and
- the determination section determines the reference color information as the color information to be used for the printing processing when the acceptance/rejection information indicates that the reference color information is to be employed.

9. The ink jet system according to claim 7, wherein
- the reception section receives adjustment information for adjusting the reference color information from the user, and the determination section determines the color information to be used for the printing processing based on the adjustment information.

10. The ink jet system according to claim 7, further comprising:

a storage section that stores the color information determined by the determination section, wherein the determination section determines the color information stored in the storage section as the color information to be used for the printing processing until the acquisition section acquires the first information which was updated, and after acquiring the updated first information, the transmitter transmits the updated first information to the server.

11. The ink jet system according to claim 1, wherein the first type of ink and the second type of ink are inks of different colors from each other, and the reference color is a multicolor.

12. An ink jet system configured to communicate with a server, the ink jet system comprising:

a first head unit that ejects a first type of ink onto a recording medium;

a second head unit that ejects a second type of ink onto the recording medium;

an acquisition section that acquires both first information regarding the first head unit and the second head unit, and second information regarding the first type of ink and the second type of ink;

a transmitter that transmits both the first information and the second information to the server; and a receiver that receives, from the server, reference color information for forming a reference color on the recording medium, which is generated based both the first information and the second information.

* * * * *